(12) United States Patent
Matsuzaki et al.

(10) Patent No.: US 7,119,475 B2
(45) Date of Patent: Oct. 10, 2006

(54) DRIVING METHOD OF PIEZOELECTRIC ACTUATOR, DRIVING APPARATUS OF PIEZOELECTRIC ACTUATOR, ELECTRONIC WATCH, ELECTRONICS, CONTROL PROGRAM OF PIEZOELECTRIC ACTUATOR, AND STORAGE MEDIUM

(75) Inventors: Jun Matsuzaki, Shiojiri (JP); Takashi Kawaguchi, Shiojiri (JP); Makoto Okeya, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 123 days.

(21) Appl. No.: 10/812,390

(22) Filed: Mar. 30, 2004

(65) Prior Publication Data

US 2004/0239381 A1 Dec. 2, 2004

(30) Foreign Application Priority Data

Mar. 31, 2003 (JP) ............................. 2003-095606

(51) Int. Cl.
*H01L 41/08* (2006.01)
(52) U.S. Cl. ........................... 310/316.01; 310/316.02; 310/323.02
(58) Field of Classification Search ........... 310/316.01, 310/316.02, 317, 319; 318/316
See application file for complete search history.

(56) References Cited

U.S. PATENT DOCUMENTS 4,914,337 A 4/1990 Takagi 5,061,882 A * 10/1991 Takagi ........................ 318/116
6,661,154 B1 * 12/2003 Shibatani ............... 310/316.01

FOREIGN PATENT DOCUMENTS

| DE | 4341073 A | 6/1995 |
|----|-----------|--------|
| JP | 07-337046 A | 12/1995 |
| JP | 09-233869 A | 5/1997 |
| JP | 2002-233175 A | 8/2002 |
| JP | 2002-291264 A | 10/2002 |

* cited by examiner

*Primary Examiner*—Mark Budd
(74) *Attorney, Agent, or Firm*—Global IP Counselors, LLP

(57) ABSTRACT

A drive device for a piezoelectric actuator, wherein the time needed to achieve highly efficient drive conditions is shortened to reduce power consumption, and stabilized control can be performed. The device has a phase difference detection device (phase difference/voltage conversion circuit (51)) for detecting detection signals of longitudinal oscillation and bending oscillation from an oscillator (5) and detecting the phase difference between these two signals, frequency control devices (52 to 56) for comparing the phase difference detected by the phase difference detection device with a standard phase difference value and controlling the frequency of a drive signal sent to a piezoelectric element (17) on the basis of the results of this comparison, and an amplitude detection device (amplitude detection circuit (57)) for detecting the amplitude of the detection signal of the piezoelectric element (17). The frequency control device compares the amplitude with a standard amplitude value and controls the frequency of the drive signal on the basis of the results of this comparison.

27 Claims, 18 Drawing Sheets

DRIVING METHOD OF PIEZOELECTRIC ACTUATOR, DRIVING APPARATUS OF PIEZOELECTRIC ACTUATOR, ELECTRONIC WATCH, ELECTRONICS, CONTROL PROGRAM OF PIEZOELECTRIC ACTUATOR, AND STORAGE MEDIUM

BACKGROUND OF THE INVENTION

1. Field of the Invention

The present invention relates to a piezoelectric actuator drive method, a piezoelectric actuator drive device, an electronic timepiece, an electronic device, a control program for a piezoelectric actuator drive device, and a storage medium.

2. Description of Related Art

Since piezoelectric elements have excellent response and efficiency in converting from electric energy to mechanical energy, various piezoelectric actuators that utilize the piezoelectric effects of piezoelectric elements have recently been developed. These piezoelectric actuators are being applied to the fields of piezoelectric buzzers, inkjet heads in printers, ultrasonic motors, electronic timepieces, portable devices, and other such electronic devices.

Size and thickness reduction is in demand for piezoelectric actuators used in these fields; therefore, piezoelectric actuators have been proposed that include a thin rectangular piezoelectric element and a plate-shaped oscillator, wherein the piezoelectric element is stretched in the longitudinal direction and caused to perform longitudinal oscillation by supplying voltage to the piezoelectric element, and bending oscillation is mechanically induced by the longitudinal oscillation.

In such a piezoelectric actuator, creating both longitudinal oscillation and bending oscillation in the oscillator allows the region in contact with the drive object of driving in the piezoelectric actuator to move in an elliptical orbit. Thus, the piezoelectric actuator achieves highly efficient driving with a small and thin configuration.

Conventional art for driving a piezoelectric actuator with the previously described configuration is disclosed in Japanese Laid-open Patent Application No. 2002-291264 (paragraph nos. [0057] to [0075], hereinafter referred to as Patent Literature 1).

Patent Literature 1 has a configuration wherein the phase difference in oscillation is determined based on a signal detected from the piezoelectric element, and the drive pulse supplied to the piezoelectric element is controlled in constant increments per pulse to obtain a drive frequency (target value) with the optimal phase difference. In Patent Literature 1, a frequency in a specific range is adopted for the drive signal during locking, a constant value within this range is used as the target value, and phase control is performed in a specific range FL of this target value, as shown in FIG. 21.

In Patent Literature 1, the phase difference alone is used to control the drive signal sent to the piezoelectric element, and it is not easy to control the phase difference.

In other words, the frequency needed to achieve highly efficient drive conditions wherein the phase difference reaches the target value is adjusted within a specific time period, and the controlled variable is made constant for each pulse (for each specific time period).

Therefore, when the controlled variable per specific time period is large, the frequency is continuously adjusted after reaching the vicinity of the target value, so the drive frequency becomes increasingly erratic and much time is required for the frequency to converge on the target value.

Depending on the situation, the controlled value may overshoot and the piezoelectric actuator may be controlled at a drive frequency far distanced from the target value (see Px in FIG. 21).

Conversely, when the controlled variable per specific period of time is small, too much time is required after turning on the power source to achieve highly efficient drive conditions wherein the vicinity of the target value is reached, and the amount of electric power consumed increases accordingly.

An object of the present invention is to provide a piezoelectric actuator drive method wherein the time required to achieve highly efficient drive conditions is shortened to reduce power consumption and to perform stable control, to provide a piezoelectric actuator drive device, to provide an electronic timepiece and an electronic device that contain this piezoelectric actuator, to provide a control program for a piezoelectric actuator drive device, and to provide a storage medium that stores this control program.

SUMMARY OF THE INVENTION

A piezoelectric actuator drive method of the present invention is a method for driving a piezoelectric actuator containing an oscillator that oscillates due to the supply of a drive signal with a specific frequency to a piezoelectric element, and a contact section that is provided to the oscillator and comes into contact with the driven object, wherein a detection signal for indicating the oscillating state of the oscillator is detected and the frequency of the drive signal sent to the piezoelectric element is controlled based on the detection signal and the drive signal or based on the detection signal; the amplitude of the detection signal of the piezoelectric element is detected; the amplitude and a standard amplitude value are compared; and the frequency of the drive signal is controlled based on the results of this comparison.

To control the frequency of the drive signal sent to the piezoelectric element on the basis of the detection signal or the detection signal and drive signal, the frequency of the drive signal should be controlled based on the current value, phase difference, amplitude, or other value that varies according to the oscillating state of the oscillator; for example, the electric current flowing through the piezoelectric element is detected and compared with a standard current value to control the frequency of the drive signal, the phase difference of a plurality of detection signals is compared with a standard phase difference value to control the frequency, or the phase difference of the detection signal and drive signal is compared with the standard phase difference value to control the frequency.

In the invention with this configuration, a two-system control technique for controlling the frequency of the drive signal on the basis of the amplitude of the detection signal is employed in addition to the frequency control of the drive signal that is implemented based on the detection signal for indicating the oscillating state of the oscillator, or is implemented based on the detection signal and drive signal.

Therefore, defects of frequency control based on the detection signal or on the detection signal and drive signal are compensated for by frequency control based on amplitude, the time required to achieve highly effective drive conditions is shortened to reduce power consumption, and stabilized control can be performed.

In the present invention as pertains to a drive method for a piezoelectric actuator, one of the two methods of controlling the frequency of the drive signal involves control by increasing or decreasing the frequency of the drive signal, and the other control method involves controlling the rate of change of the increase or decrease of the frequency of the drive signal.

In the present invention, since the increase and decrease of the frequency of the drive signal outputted to the piezoelectric element and the rate of this increase and decrease are both controlled, control can be performed by quickly reaching the target value by increasing the rate of change when the value is far distanced from the target value, and stabilized control free of large fluctuations can be performed by decreasing the rate of change when the value is near the target value. Therefore, the time required to achieve highly efficient drive conditions can be shortened, power consumption can be reduced, and stabilized control can be performed with high precision.

The present invention as pertains to a drive method for a piezoelectric actuator preferably has a configuration wherein the frequency of the drive signal is increased or decreased based on the detection signal and drive signal or based on the detection signal, and the rate of change of the increase or decrease of the frequency of the drive signal is controlled based on the results of comparing the amplitude and the standard amplitude value.

In the invention with this configuration, sometimes the value of the detection signal is far off from the standard value immediately after the piezoelectric actuator is started up, such as, for example, when the phase difference is far off from the standard phase difference value, but in this case, the frequency of the drive signal is increased or decreased to bring the phase difference closer to the standard phase difference value.

At this point, the rate of change of the increase or decrease of the frequency of the drive signal is controlled upon comparing the amplitude and the standard amplitude value of the signal detected by the piezoelectric element.

Therefore, control can be performed with a higher degree of precision by controlling the increase and decrease of the frequency of the drive signal outputted to the piezoelectric element as well as the rate of increase or decrease thereof.

Furthermore, the present invention as pertains to a drive method for a piezoelectric actuator is preferably configured such that the rate of change of the increase or decrease of the frequency of the drive signal is reduced when the amplitude and a standard amplitude value are compared and the amplitude is equal to or greater than the standard amplitude value, and the rate of change of the increase or decrease of the frequency of the drive signal is increased when the amplitude and the standard amplitude value are compared and the amplitude is less than the standard amplitude value.

In the invention with this configuration, the frequency of the drive signal sent to the piezoelectric element is increased or decreased such that target phase difference value is reached based on the detection signal or the detection signal and drive signal; for example, based on the results of comparing the detected phase difference and the standard phase difference value. The amplitude of the detection signal detected by the piezoelectric element is sometimes less than the standard amplitude value immediately after the piezoelectric actuator is started up, but in this case, for example, the time needed to achieve highly efficient drive conditions whereby the phase difference is brought closer to the target phase difference value is reduced in order to increase the rate of change of the frequency for the piezoelectric element in a specific time period. When the value draws closers to the target value, the amplitude of the detection signal detected by the piezoelectric element is equal to or greater than the target amplitude value, and the rate of change of the frequency for the piezoelectric element in a specific time period is reduced. Therefore, fluctuations in the frequency of the drive signal are reduced, and stabilized control can be performed.

Also, the present invention as pertains to the drive method for a piezoelectric actuator is preferably designed such that the phase difference of the detection signal and the drive signal outputted from the oscillator to indicate the oscillating state of the oscillator is detected and the frequency of the drive signal sent to the piezoelectric element is controlled based on the results of comparing the phase difference and the standard phase difference value; the amplitude of the detection signal is detected; the amplitude and a standard amplitude value are compared; and the frequency of the drive signal is controlled based on the results of this comparison.

Furthermore, the present invention as pertains to the drive method for a piezoelectric actuator may be designed such that a plurality of detection signals outputted from the oscillator to indicate the oscillating state of the oscillator are detected and the frequency of the drive signal sent to the piezoelectric element is controlled based on the results of comparing the phase difference and the standard phase difference value; the amplitude of at least one detection signal from among these detection signals is detected; the amplitude and a standard amplitude value are compared; and the frequency of the drive signal is controlled based on the results of this comparison.

When an driven object is rotatably driven by the piezoelectric actuator, either the phase difference of the detection signal and the drive signal outputted from the oscillator or the phase difference of the plurality of detection signals outputted from the oscillator creates a change nearest to the correlation between the frequency of the drive signal and the rotational speed of the driven object. Therefore, if the frequency is controlled based on the phase difference, drive control can be performed more efficiently and with better precision in comparison with cases in which the frequency of the drive signal is performed by the electric current value or other such parameters. Moreover, to measure the electric current value, it must be detected as a voltage value by providing resistance and the circuit configuration becomes complicated, but if the detection signal outputted from the oscillator is detected, the circuit value can be simplified and control can be easily performed because the phase and amplitude of the signal can be easily obtained.

Also, the phase of the detection signal varies depending on the oscillating state, but since the phase of the drive signal is constant, the frequency of the drive signal can be easily controlled through the phase difference if the phase difference of the detection signal and drive signal is determined to perform a control.

Since the fluctuation in the amplitude of the detection signal varies according to the driving state and the like of the driven object, detecting a plurality of detection signals makes it possible to detect the amplitude of a detection signal whose change in amplitude is easily detectable according to the driven object or the like, so frequency control based on amplitude can be easily performed.

Also, the drive method for a piezoelectric actuator of the present invention is preferably designed such that the oscillator oscillates in a first oscillation mode and a second oscillation mode due to the supplying of a drive signal with a specific frequency to the piezoelectric element, and the detection signal is outputted from the oscillator and used to indicate the oscillating state in the first oscillation mode and/or second oscillation mode.

The detection signal for indicating the oscillating state in the first oscillation mode and the detection signal for indicating the oscillating state in the second oscillation mode are not limited to a detection signal corresponding to only the oscillating state of their respective oscillation modes, and may be detection signals that are affected primarily by the oscillating state of their respective oscillation modes but that contain components of the other oscillation mode.

In the invention with this configuration, the oscillator is made to oscillate in the first and second oscillation modes, so, for example, the contact section of the piezoelectric actuator can be made to move in an elliptical orbit and the driven object can be rotatably driven with ease. Since the fluctuation in the amplitude of the detection signals differs depending on the driven object, control can be readily performed by selecting a detection signal that has a large margin of fluctuation in amplitude and is easily detected.

The drive device for a piezoelectric actuator of the present invention is a drive device for a piezoelectric actuator wherein a drive signal is sent to a piezoelectric element in the piezoelectric actuator, which has an oscillator that oscillates due to the supply of a drive signal with a specific frequency to the piezoelectric element, and which also has a contact section provided to the oscillator and designed for coming in contact with the driven object, wherein the drive device contains a frequency control device for controlling the frequency of the drive signal, and an amplitude detection device for detecting the amplitude of the detection signal, and wherein the frequency control device detects a detection signal for indicating the oscillating state of the oscillator and controls the frequency of the drive signal on the basis of the detection signal and the drive signal or on the basis of the detection signal, and also compares the amplitude and the standard amplitude value and controls the frequency of the drive signal on the basis of the results of this comparison.

In the invention with this configuration, the frequency of the drive signal sent to the piezoelectric element is controlled based on a detection signal or on a detection signal and the drive signal, but in the frequency control device, the amplitude of the detection signal detected by the amplitude detection device is compared with the standard amplitude value, and the frequency of the drive signal is controlled while referring to the results of this comparison.

Therefore, the present invention can provide a drive device for a piezoelectric actuator wherein the time needed to achieve highly efficient driving conditions is shortened to reduce power consumption, and stabilized control can be performed.

The present invention as pertains to the drive device for a piezoelectric actuator is preferably designed such that the frequency control device has a frequency increase/decrease control device for controlling the increase or decrease in the frequency of the drive signal, and a frequency increase/decrease rate control device for controlling the rate of change of the increase or decrease in the frequency of the drive signal, and one of the frequency increase/decrease control device or frequency increase/decrease rate control device detects a detection signal for indicating the oscillating state of the oscillator and controls the frequency of the drive signal on the basis of the detection signal and the drive signal or on the basis of the detection signal, while the other one of the frequency increase/decrease control device or frequency increase/decrease rate control device compares the amplitude and the standard amplitude value and controls the frequency of the drive signal on the basis of the results of this comparison.

Since this invention has a frequency increase/decrease control device for controlling the increase and decrease in the frequency of the drive signal outputted to the piezoelectric element, and a frequency increase/decrease rate control device for controlling the rate of increase or decrease, the target value can quickly be reached to perform a control by increasing the rate of change with the frequency increase/decrease rate control device when the value is far off from the target value, and stabilized control free of large fluctuations can be performed by decreasing the rate of change with the frequency increase/decrease rate control device when the value is near the target value. Consequently, the time needed to achieve highly efficient driving conditions is shortened, power consumption can be reduced, and stabilized control with a high degree of precision can be performed.

In the present invention as pertains to a drive device for a piezoelectric actuator, the frequency control device preferably has a frequency increase/decrease control device for increasing or decreasing the frequency of the drive signal on the basis of the detection signal and the drive signal or on the basis of the detection signal, and a frequency increase/decrease rate control device for controlling the rate of change of the increase or decrease in the frequency of the drive signal on the basis of the results of comparing the amplitude and the standard amplitude value.

In this invention, for example, the frequency increase/decrease control device controls the increase and decrease of the frequency of the drive signal on the basis of the phase difference between the detection signal and the drive signal or the like, and the frequency increase/decrease rate control device can control the rate of change of the increase and decrease on the basis of the amplitude of the detection signal; therefore, the rate of change is increased to move closer to the target value quickly when it can be determined that the amplitude is low and the phase difference or the like is far off from the target value, and the rate of change can be reduced to perform stabilized control when it can be determined that the amplitude is high and is close to the target value. Consequently, the time needed for the piezoelectric actuator to achieve highly efficient driving conditions can be shortened, and power consumption can be reduced.

Also, the present invention as pertains to a drive device for a piezoelectric actuator preferably has a phase difference detection device that detects a detection signal for indicating the oscillating state of the oscillator, and then detects either the phase difference between the detection signal and the drive signal or the phase difference between a plurality of detection signals, and the frequency control device compares the phase difference detected by the phase difference detection device with the standard phase difference value and controls the frequency of the drive signal sent to the piezoelectric element on the basis of the results of this comparison, and also compares the amplitude and the standard amplitude value and controls the frequency of the drive signal on the basis of the results of this comparison.

If frequency control is performed based on the phase difference, drive control can be performed efficiently and with precision, the circuit configuration can be simplified, and control can be facilitated in comparison with cases in which the drive signal of the drive signal is controlled by the electric current value or other such parameters as previously described.

In the present invention as pertains to a drive device for a piezoelectric actuator, the phase difference detection device is preferably a phase difference/voltage conversion circuit that detects the phase difference and outputs a phase difference voltage signal having a voltage value equivalent to this phase difference.

In the invention with this configuration, the phase difference is converted to a voltage value and the signal converted to this voltage value is outputted to a frequency control device, making it easier to achieve high-precision control with the frequency control device.

Furthermore, a configuration is preferred wherein the frequency control device has a constant voltage circuit for outputting a standard voltage for comparing the phase difference and a standard voltage for detecting amplitude; a comparison circuit that compares the standard voltage for phase comparison outputted by the constant voltage circuit with the phase difference voltage outputted from the phase difference/voltage conversion circuit, and outputs a comparison result signal; and a drive control section that receives the comparison result signal outputted by the comparison circuit and controls the frequency of the drive signal sent to the piezoelectric element, wherein the amplitude detection device is an amplitude detection circuit that detects amplitude by comparing the standard voltage for amplitude detection outputted by the constant voltage circuit with the detection signal of the piezoelectric element, and wherein the drive control section has functions for decreasing the rate of change in frequency over a specific period of time when the amplitude detection voltage detected by the amplitude detection circuit is equal to greater than the standard voltage, and increasing the rate of change in frequency over a specific period of time when the amplitude detection voltage detected by the amplitude detection circuit is less than the standard voltage.

In the invention with this configuration, the standard voltage for comparing the phase difference is outputted to the comparison circuit in the constant voltage circuit, and the comparison circuit compares the phase difference voltage signal outputted from the phase difference/voltage conversion circuit with the standard voltage and outputs the comparison result signal, and this comparison result signal is sent to the drive control section.

Having received this signal, the drive control section controls the frequency of the drive signal sent to the piezoelectric element, but since at this point the rate of change in frequency is reduced when the amplitude detection voltage is equal to or greater than the standard voltage, and the rate of change is frequency in increased when the amplitude detection voltage is less than the standard voltage, the time needed to achieve highly efficient drive conditions can be reduced and stabilized control can be performed without overshooting.

Therefore, in the present invention, drive signal control can be performed for the piezoelectric actuator with a high degree of precision by employing a configuration wherein the rate of change in the frequency of the drive signal is adjusted based on the results of comparing the amplitude detection voltage and the standard voltage.

Moreover, the drive control section preferably has a configuration that contains a drive circuit for supplying a drive signal to the piezoelectric element, a voltage control oscillator for outputting a frequency corresponding to the voltage inputted to the drive circuit, and a voltage adjustment circuit for adjusting the voltage supplied to the voltage control oscillator on the basis of the results of comparing the amplitude and the standard amplitude value.

In the invention with this configuration, drive signal control can be performed for the piezoelectric actuator with a high degree of precision by employing a voltage control oscillator and a voltage adjustment circuit with the previously described configurations.

Furthermore, the voltage adjustment circuit preferably has a configuration that contains a voltage adjustment section for adjusting the voltage outputted to the voltage control oscillator, a clock circuit capable of varying the frequency of an outputted clock signal, and a control circuit for outputting a signal to the voltage adjustment section according to the clock signal outputted by the clock circuit, and varying the frequency of the clock signal on the basis of the amplitude signal detected by the amplitude detection circuit.

In the invention with this configuration, the voltage adjustment circuit is commonly configured by utilizing a clock circuit widely used as a control circuit, allowing the structure of the voltage adjustment circuit, and hence of the drive device, to be simplified.

Moreover, the control circuit preferably has a configuration that slows the clock signal outputted from the clock circuit when the amplitude signal is equal to or greater than the standard voltage, and speeds up the clock signal outputted from the clock circuit when the amplitude signal is less than the standard voltage.

In the invention with this configuration, control can be performed with a higher degree of precision because the speed of the clock signal is determined by comparing the amplitude signal and the standard voltage.

Also, the voltage adjustment circuit preferably has a configuration that contains a loop filter that has different time constants and that outputs a voltage to the voltage control oscillator according each of the time constants, and a control circuit for selecting a time constant from the loop filter on the basis of the amplitude signal detected by the amplitude detection circuit.

In the invention with this configuration, the voltage adjustment circuit is configured by utilizing a loop filter widely used as a phase synchronization circuit, making it possible to simplify the structure of the voltage adjustment circuit, and hence of the drive device.

Moreover, the control circuit preferably has a configuration that decreases the amount of voltage outputted from the loop filter when the amplitude signal is equal to or greater than the standard voltage, and increases the amount of voltage outputted from the loop filter when the amplitude signal is less than the standard voltage.

In the invention with this configuration, control can be performed with a higher degree of precision because the amount of voltage outputted by the loop filter is adjusted by comparing the amplitude signal and the standard voltage.

The electronic timepiece of the present invention contains a piezoelectric actuator with an oscillator that oscillates due to the supply of a drive signal with a specific frequency to a piezoelectric element, and with a contact section that is provided to the oscillator and comes into contact with the driven object; a drive device for the piezoelectric actuator with the configuration previously described; and a date display mechanism driven by the piezoelectric actuator.

In the invention with this configuration, it is possible to provide an electronic timepiece wherein power consumption is reduced and stabilized control can be achieved in a short time.

The electronic device of the present invention has a piezoelectric actuator with an oscillator that oscillates due to the supply of a drive signal with a specific frequency to a piezoelectric element, and with a contact section that is provided to the oscillator and comes into contact with the driven object; and a drive device for the piezoelectric actuator with the configuration previously described.

In the invention with this configuration, it is possible to provide an electronic device wherein power consumption is reduced and stabilized control can be achieved in a short time, and it is particularly possible to provide a compact electronic device suitable for portability.

The program of a drive device for a piezoelectric actuator of the present invention is a program of a drive device for a piezoelectric actuator wherein a drive signal is sent to a piezoelectric element in a piezoelectric actuator containing an oscillator that oscillates due to the supply of a drive signal with a specific frequency to a piezoelectric element, and also containing a contact section that is provided to the oscillator and comes into contact with the driven object; and a computer incorporated into the drive device is made to function as an amplitude detection device for detecting the amplitude of the detection signal, and as a frequency control device for detecting a detection signal for indicating the oscillating state of the oscillator, controlling the frequency of the drive signal sent to the piezoelectric element on the basis of the detection signal or the detection signal and the drive signal, comparing the amplitude and the standard amplitude value, and controlling the frequency of the drive signal on the basis of the results of this comparison.

Also, the storage medium of the present invention is a storage medium capable of being read by a computer that stores the program.

According to the present invention, the time needed to achieve highly efficient drive conditions is shortened to reduce power consumption, and stabilized control can be performed as previously described by causing the computer incorporated into the drive device to function as these devices. If each device is configured as a computer, the appropriate control corresponding to the driven object can be easily performed because the conditions can easily be varied merely by modifying the program.

DESCRIPTION OF THE PREFERRED EMBODIMENTS

Embodiments of the present invention will now be described with reference to the diagrams.

First, an electronic timepiece that contains a date display mechanism driven by a piezoelectric actuator will be given as an example for the first embodiment.

1. Entire Configuration

Figure 1:
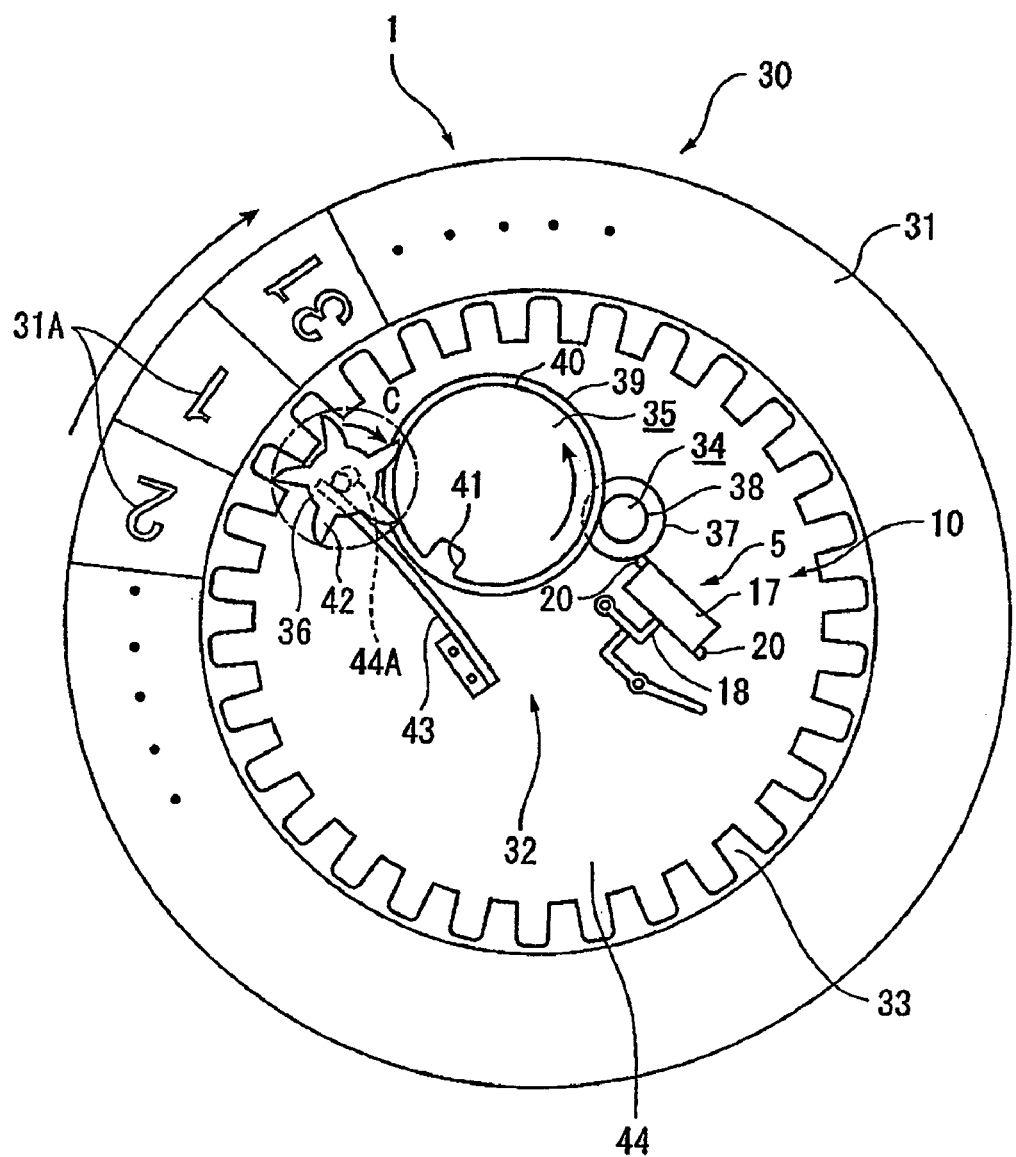
FIG. 1 is a plan view showing the main configuration of a date display mechanism in an electronic timepiece relating to the first embodiment of the present invention.
Figure 2:
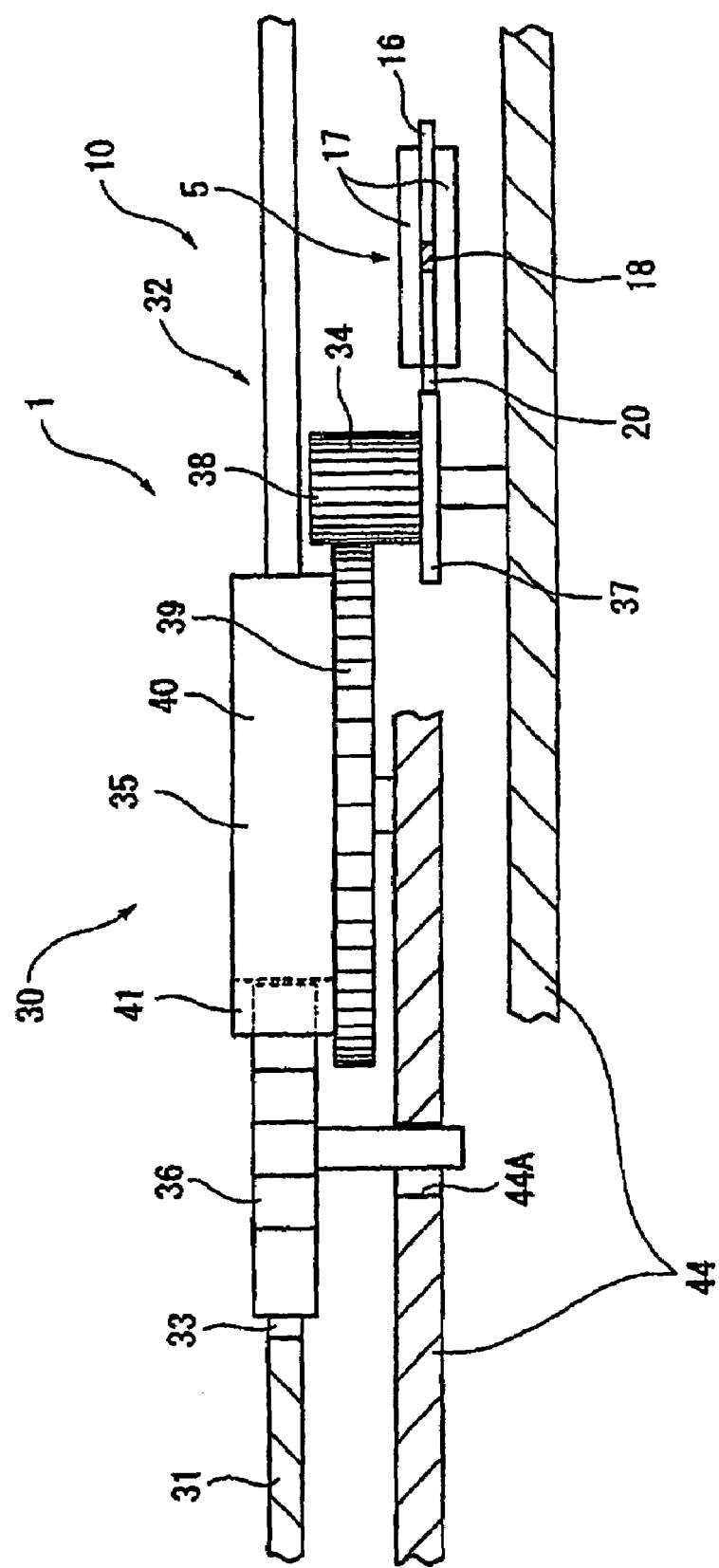
FIG. 2 is a cross-sectional view showing the basic configuration of the electronic timepiece.

An electronic timepiece 1 relating to the first embodiment is shown in FIGS. 1 and 2. FIG. 1 is a plan view showing the main configuration of the date display mechanism incorporating a piezoelectric actuator, and FIG. 2 is a cross-sectional view thereof.

A date display mechanism 30 contains a date wheel 31 for displaying the date, a power transmitting mechanism 32 for transmitting a driving force to rotate the date wheel 31, and an oscillator 5 for supplying the driving force to the power transmitting mechanism 32, as shown in FIGS. 1 and 2.

Though not shown in the diagram, the date display mechanism 30 is housed in a timepiece case, and part of the date wheel 31 is visible from a window formed in the case.

The date wheel 31 is a ring-shaped flat plate member, and a date display 31A is formed in the surface by printing or other methods. A date turning gear 33 for rotating the date wheel 31 is formed in the inner peripheral surface of the date wheel 31. The date turning gear 33 is set such that the gap (pitch) in one tooth constitutes one day in the date display 31A, or, in other words, the date display 31A is turned one day when the date turning gear 33 is turned one interval, so that the date is changed.

The power transmitting mechanism 32 contains a date indicator driving wheel 36 interlocking with the date turning gear 33, an intermediate date wheel 35 interlocking with the date indicator driving wheel 36, and a transmission wheel 34 that interlocks with the intermediate date wheel 35 and integrally contains a rotor 37 as a driven member.

The date indicator driving wheel 36 has five finger sections 42 in the periphery, and the pitch thereof is set such that there is interlocking with the date turning gear 33. The axle of the date indicator driving wheel 36 is rotatably supported in a slot 44A provided to a base plate 44. A press plate 43 fixed by one end is also mounted on the base plate 44, and the other end of the press plate 43 comes into contact with the axle of the date indicator driving wheel 36. The date indicator driving wheel 36 is urged toward the intermediate date wheel 35 by this press plate 43.

The intermediate date wheel 35 contains a disk-shaped date turning section 40 with which the finger sections 42 of the date indicator driving wheel 36 come into contact, and a gear 39 formed integrally with the date turning section 40. A concavity 41 is provided in one location in the periphery of the date turning section 40.

The transmission wheel 34 contains a rotor pinion 38 interlocking with the gear 39, and a rotor 37 formed integrally with the rotor pinion 38. The outer periphery of the rotor 37 is provided with a concave and convex section (not shown) in which tooth-shaped sections made of an involute curve with a pressure angle of 20°, for example, are arranged at equal intervals. The rotor 37 is configured from a silicon wafer and is formed by etching. The rotor 37 and rotor pinion 38 are joined by adhesion, brazing, or the like.

The date display mechanism 30 as such operates as follows.

When voltage is repeatedly applied to the oscillator 5, the oscillator 5 oscillates such that the convexities 20 provided on both sides thereof move in an elliptical orbit. The convexities 20 interlock with the concave and convex sections in the rotor 37 in part of the elliptical orbit when the oscillator 5 is elongated, causing the rotor 37 to rotate intermittently. Repeating this process causes the rotor 37 to rotate at a specific rotational speed.

The intermediate date wheel 35 is set to turn fully in 24 hours, so the concavity 41 in the date turning section 40 is located at the area that comes into contact with the date indicator driving wheel 36 every 24 hours. Since the axle of the date indicator driving wheel 36 is urged by the press plate 43, the finger sections 42 engage with the concavity 41. At this point, the finger sections 42 push on the date turning gear 33 in the direction of the arrow C in FIG. 1, which causes the date wheel 31 to rotate. Thus, the date display 31A of the date wheel 31 is turned by one day, and the changed date is displayed from the exterior of the timepiece.

2. Piezoelectric Actuator

In the present embodiment, a piezoelectric actuator 10 is configured with the rotor 37 and the oscillator 5.

The oscillator 5 contains a reinforcing plate 16 formed into a roughly rectangular flat plate, a flat plate-shaped piezoelectric element 17 provided on both the front and back surfaces of the reinforcing plate 16, and an arm section 18 for mounting the reinforcing plate 16 on the side of the case.

Figure 3:
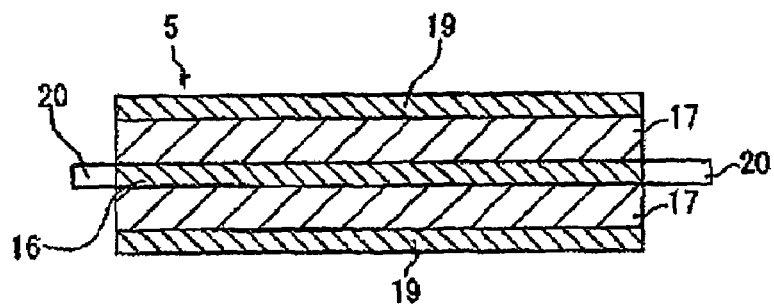
FIG. 3 is a cross-sectional view showing an oscillator, which is a constituent element of a piezoelectric actuator used in the electronic timepiece.
Figure 4:
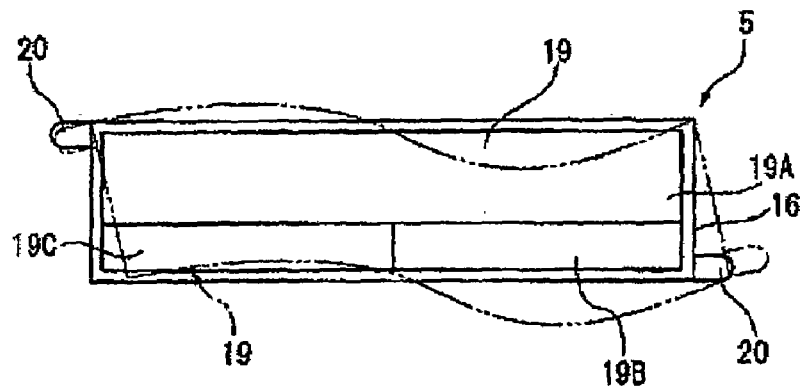
FIG. 4 is a plan view showing the oscillator.

The reinforcing plate 16 is configured from SUS301 with a hardness of 500 HV, a similar type of stainless steel, or another material, and is formed into a rectangular shape with a length to width ratio of about 7:2. Also, the contacting convexities 20 are integrally formed in both ends in the diagonally lengthwise direction of the reinforcing plate 16, as shown in FIGS. 3 and 4. The tips of the convexities 20 are formed into involute curves with a pressure angle of 20°, for example, similar to the convex and concave section (not shown) of the rotor 37.

The piezoelectric element 17 is bonded in roughly rectangular portions on both sides of the reinforcing plate 16. The material for the piezoelectric element 17 is not particularly limited, and lead zirconate titanate (PZT), quartz, lithium niobate, barium titanate, lead titanate, lead metaniobate, vinylidene polyfluoride, zinc lead niobate, scandium lead zirconate, and other such various substances can be used.

Also, electrodes 19 made of a nickel plating layer and a gold plating layer or the like are formed on both sides of the piezoelectric element 17.

Figure 5:
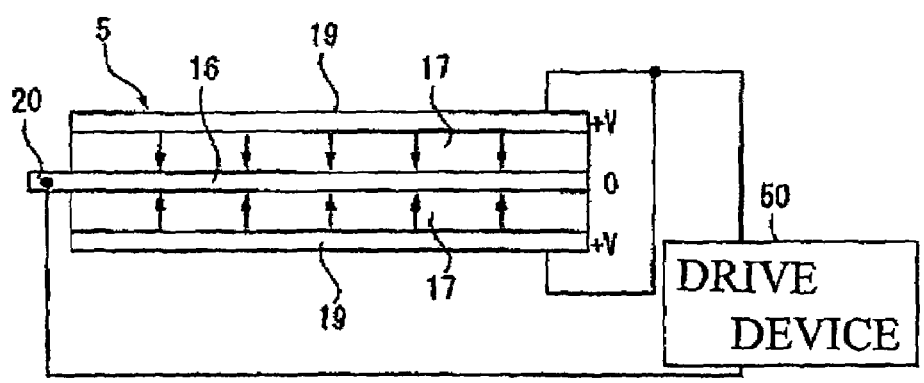
FIG. 5 is a schematic structural view of when voltage is applied to the piezoelectric element of the oscillator.

A drive signal is sent from a drive device 50 to the piezoelectric element 17 via these electrodes 19 as shown in FIG. 5.

When the directions of polarization of the piezoelectric element 17 are opposite, applying the drive signal from the drive device 50 such that the electric potential in the top, middle, and bottom surfaces is +V, 0, +V (or −V, 0, −V), respectively, causes displacement so that the plate-shaped piezoelectric element 17 expands and contracts (see the dashed line in FIG. 4), and the displacement due to such elasticity is utilized in the present embodiment. When the directions of polarization of the piezoelectric element 17 are the same, voltage should be applied such that the electric potential in the top, middle, and bottom surfaces is +V, 0, −V (or −V, 0, +V), respectively.

The electrodes 19 contain an electrode 19A formed extending from one widthwise side of the piezoelectric element 17 to the middle, and also contain two electrodes 19B and 19C formed on the other widthwise side of the piezoelectric element 17 and divided approximately at the middle in the longitudinal direction.

Lead-out wires (not shown) are connected to each of these electrodes 19A, 19B, and 19C. The electrode 19A constitutes a driving electrode for supplying voltage to cause the oscillator 5 to oscillate, the electrode 19B constitutes a detection electrode for detecting longitudinal oscillation arising in the oscillator 5, and the electrode 19C constitutes a detection electrode for detecting bending oscillation.

In the oscillator 5 thus configured, oscillation that extends in the longitudinal direction is produced in the piezoelectric element 17 when a drive signal with an alternating current is applied from the drive device 50 to the piezoelectric element 17 via the electrode 19A. At this point, the piezoelectric element 17 extends and contracts in the longitudinal direction, causing longitudinal oscillation whereby the oscillator 5 extends and contracts in the longitudinal direction, thus causing the oscillator 5 to oscillate in the first oscillation mode. Thus, when the oscillator 5 is electrically excited by longitudinal oscillation due to the application of the drive signal to the piezoelectric element 17, a rotational moment centered around the center of gravity of the oscillator 5 is created by the unbalanced weight of the oscillator 5. This rotational moment induces bending oscillations whereby the oscillator 5 shakes in the width direction. This bending oscillation constitutes the second oscillation mode, wherein the direction of oscillation is different from that in the first oscillation mode.

The relationship between the resonance frequency of each type of oscillation and the frequency of the applied drive signal is such that when the voltage value of the applied drive signal is constant, the amplitude of each type of oscillation gradually decreases when the frequency of the drive signal is far off from the resonance frequency, with the resonance frequency of each type of oscillation at a maximum. Also, since the bending oscillation of the oscillator 5 is induced by the gravity unbalance during longitudinal oscillation, the phase difference with the longitudinal oscillation is shifted by the size of the amplitude of the longitudinal oscillation or the like. Specifically, the properties are such that the difference between the phase of the longitudinal oscillation and the phase of the bending oscillation changes due to the frequency of the drive signal.

The degree of amplitude and the degree of phase difference at which each type of oscillation is excited must be set to achieve the necessary driving, but these depend on the frequency of the drive signal applied to the piezoelectric element 17 from the properties of the oscillator 5, as described above.

3. Drive Device and Drive Method for Piezoelectric Actuator

The configuration of the drive device 50 will now be described with reference to FIG. 6.

Figure 6:
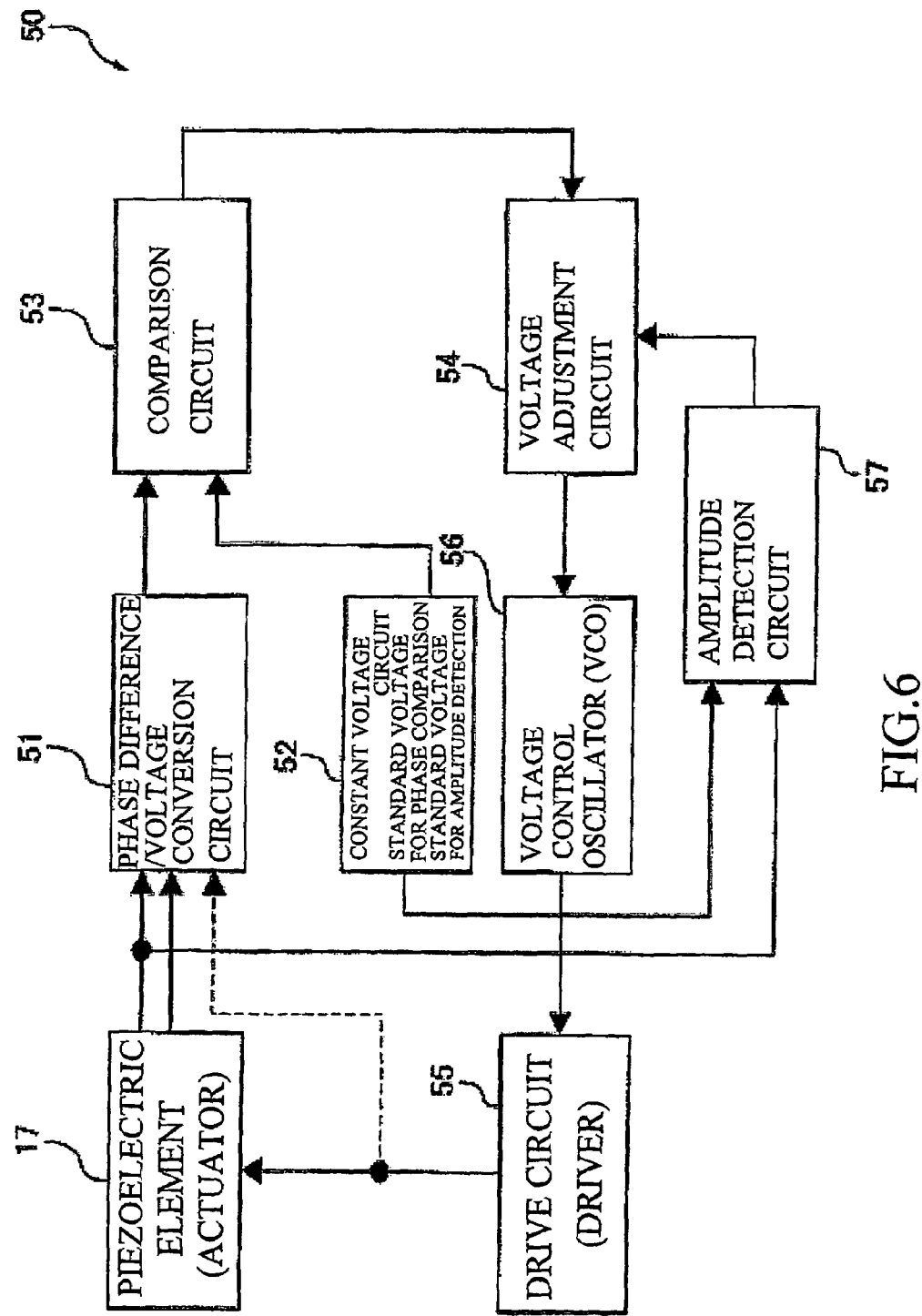
FIG. 6 is a block diagram showing the internal configuration of a drive device for a piezoelectric actuator.

In FIG. 6, the drive device 50 contains a phase difference/voltage conversion circuit 51 for detecting the phase difference between the longitudinal detection signal and the bending detection signal detected at two locations in the piezoelectric element 17, a constant voltage circuit 52 for outputting both standard voltage for comparing the phase difference and standard voltage for detecting amplitude signals, a comparison circuit 53 for comparing the standard voltage for phase comparison outputted by the constant voltage circuit 52 with the phase difference voltage outputted from the phase difference/voltage conversion circuit 51 and outputting a comparison result signal, a voltage adjustment circuit 54 for receiving the comparison result signal and controlling the drive voltage supplied to the piezoelectric element 17, a voltage control oscillator 56 for adjusting the frequency outputted to a drive circuit 55 according to the voltage outputted by the voltage adjustment circuit 54, and an amplitude detection circuit 57 for comparing the standard voltage for amplitude detection outputted by the constant voltage circuit 52 with the amplitude signal of the piezoelectric element 17 and detecting the amplitude signal.

The amplitude detection circuit 57 may have any specific configuration as long as it can detect an amplitude signal, and may, for example, detect the value of a specific amplitude in a specific period of time, or may also merely detect the amplitude level or the peak amplitude level.

In the present embodiment, the drive control section for controlling the frequency of the drive signal sent to the piezoelectric element 17 is configured with a drive circuit 55, a voltage control oscillator 56, and a voltage adjustment circuit 54. A frequency control device is configured with the drive control section, a constant voltage circuit 52, and a comparison circuit 53. Also, in the present embodiment, frequency control based on the phase difference of the detection signals (frequency increase/decrease control) and frequency control based on the amplitude of the detection signals (frequency increase/decrease rate control) are simultaneously performed by inputting a signal outputted from the comparison circuit 53 and a signal outputted from the amplitude detection circuit 57 into the voltage adjustment circuit 54, as will be hereinafter described. Consequently, of the frequency control devices in the present embodiment, a frequency increase/decrease control device for controlling the increase and decrease of the frequency of the drive signal and a frequency increase/decrease rate control device for controlling the rate of increase or decrease of the frequency of the drive signal are configured primarily by the voltage adjustment circuit 54.

Figure 7A:
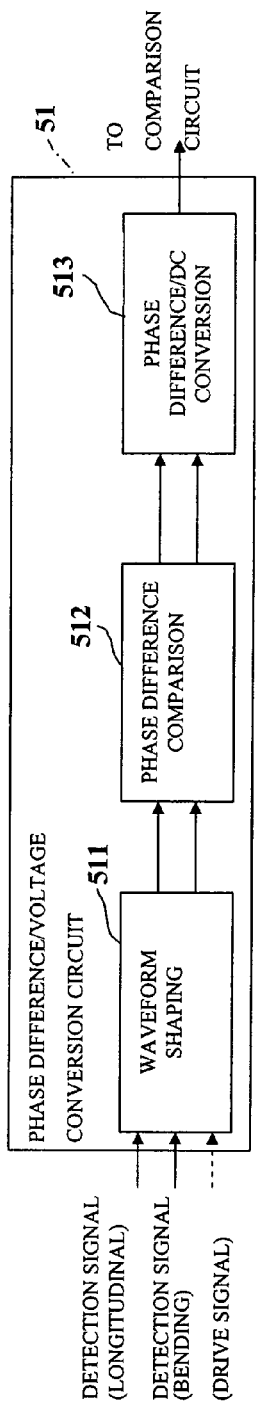
FIG. 7A is a block diagram showing the internal configuration of a phase difference/voltage conversion circuit.

The phase difference/voltage conversion circuit 51 constitutes a phase difference detection device, and contains a waveform shaping section 511 for shaping the waveforms of the longitudinal detection signal and the bending detection signal both outputted from the piezoelectric element 17, a phase difference comparison section 512 for comparing the phase difference between the two waveforms shaped by the waveform shaping section 511, and a phase difference/DC converter 513 for performing DC conversion on the voltage value corresponding to the phase difference compared by the phase difference comparison section 512 and outputting a phase difference voltage signal, as shown in FIG. 7A.

The constant voltage circuit 52 is configured to present the comparison circuit 53 with an output standard voltage for phase comparison having a voltage value that is equivalent to the optimal phase difference between the longitudinal detection signal and the bending detection signal, and to present the amplitude detection circuit 57 with an output standard voltage for amplitude detection having a voltage value that is equivalent to the optimal amplitude value (target value) of the detection signal.

The voltage adjustment circuit 54 has a voltage control function for controlling the alternating current voltage supplied to the piezoelectric element 17 on the basis of a signal outputted from the comparison circuit 53, and a control rate adjustment function for adjusting the amount of voltage control over the piezoelectric element 17 per a specific time period on the basis of a signal outputted by the amplitude detection circuit 57.

Figure 7B:
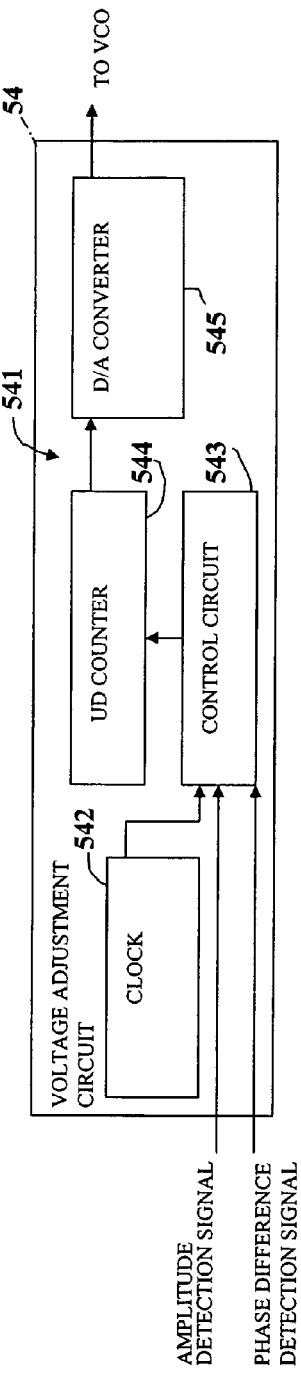
FIG. 7B is a block diagram of one example of the internal configuration of a voltage adjustment circuit.
Figure 7C:
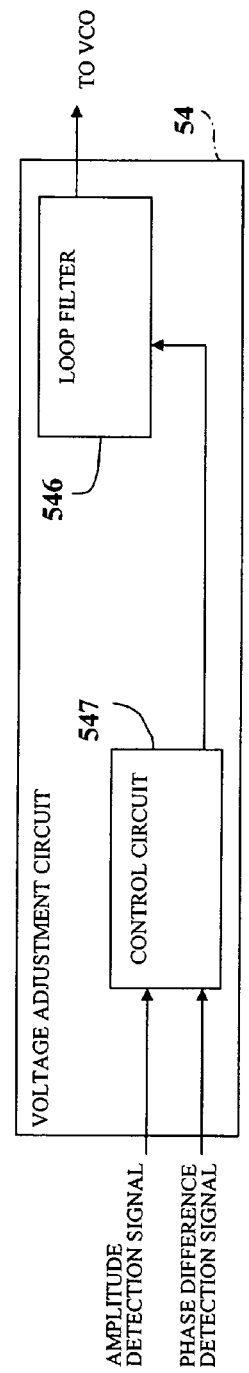
FIG. 7C is a block diagram showing the internal configuration of another example of a voltage adjustment circuit.

The configurations shown in FIG. 7B and FIG. 7C can be both employed as the voltage adjustment circuit 54.

Figure 8:
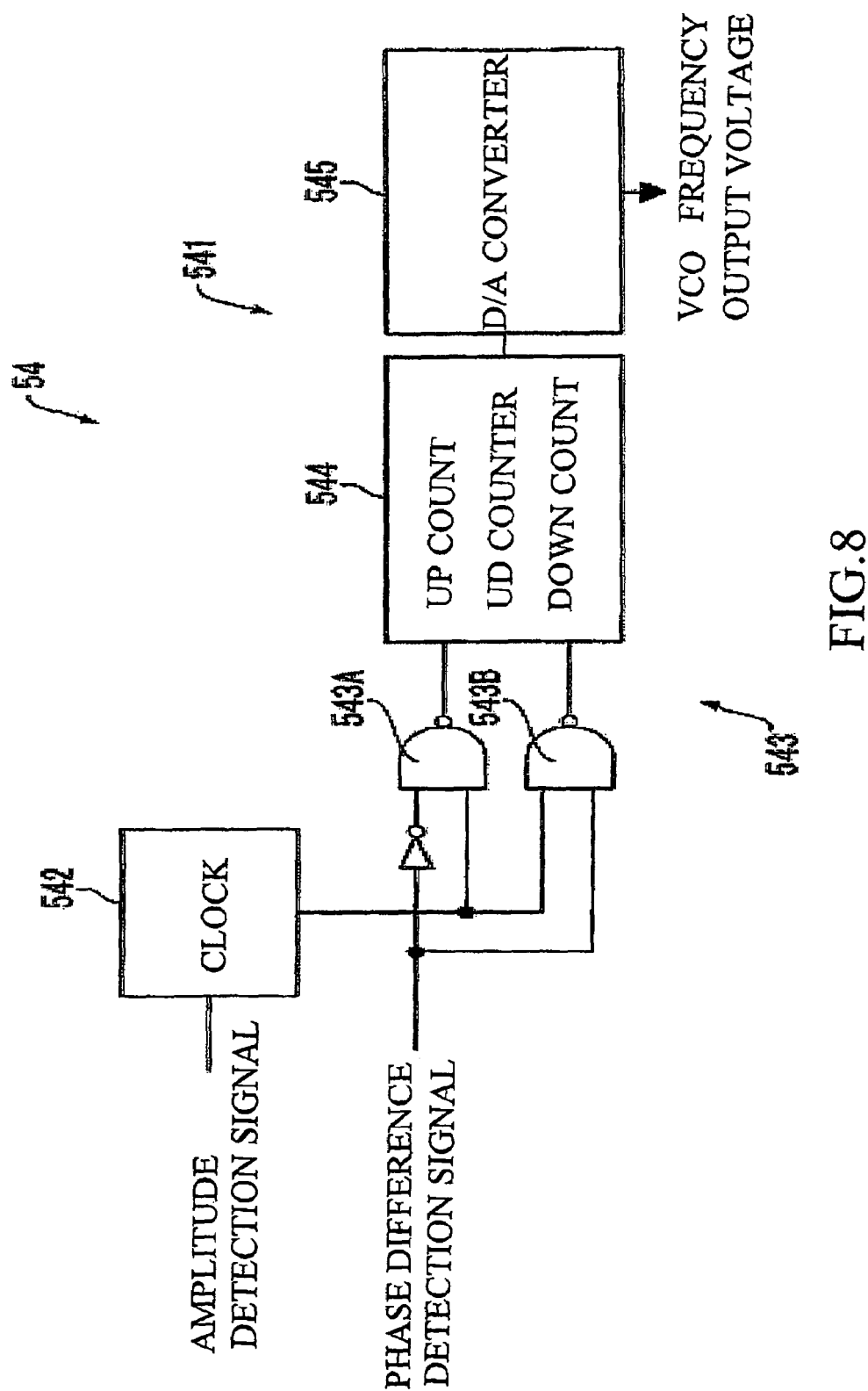
FIG. 8 is a block diagram showing the internal configuration of the voltage adjustment circuit in FIG. 7B in detail.

One example of the voltage adjustment circuit 54 is shown in FIGS. 7B and 8. In FIGS. 7B and 8, the voltage adjustment circuit 54 contains a voltage adjustment section 541 for adjusting the voltage outputted to the voltage control oscillator 56, a clock circuit 542 capable of varying the frequency of an outputted clock signal, and a control circuit 543 for outputting a signal to the voltage adjustment section 541 according to the clock signal outputted by the clock circuit 542. The control circuit 543 varies the frequency of the clock signal on the basis of the amplitude signal detected by the amplitude detection circuit 57.

The voltage adjustment section 541 contains an up-down counter (UD counter) 544 that counts up to raise the voltage value when the phase difference detection signal is less than the target value and that counts down to lower the voltage value when the phase difference detection signal is higher than the target value, and a D/A converter 545 for converting a digital signal outputted from the UD counter 544 to an analog signal.

The control circuit 543 contains NAND gates 543A and 543B, and is configured to slow the clock signal (for example, 1 kHz) outputted from the clock circuit 542 when the amplitude signal is equal to or greater than the standard voltage, and to speed up the clock signal (for example, 100 kHz) outputted from the clock circuit 542 when the amplitude signal is less than the standard voltage.

The NAND gates 543A and 543B input a high-level signal and low-level signal, and a pulse signal outputted from the clock circuit 542, and output a signal to the up-down counter 544 according to the input timing of this pulse signal.

The UD counter 544 adds the information inputted via the NAND gates 543A and 543B. The UD counter 544 is configured, for example, from a 12-bit counter or the like, and raises or lowers the counter value according to the signal from the NAND gates 543A and 543B.

The frequency control voltage value in the D/A converter 545 is set according to the counter value of the UD counter 544. When provided with the counter value outputted from the UD counter 544, the D/A converter 545 then presents the voltage control oscillator 56 with a frequency control voltage value equivalent to the frequency control voltage value that corresponds to the counter value.

Figure 9:
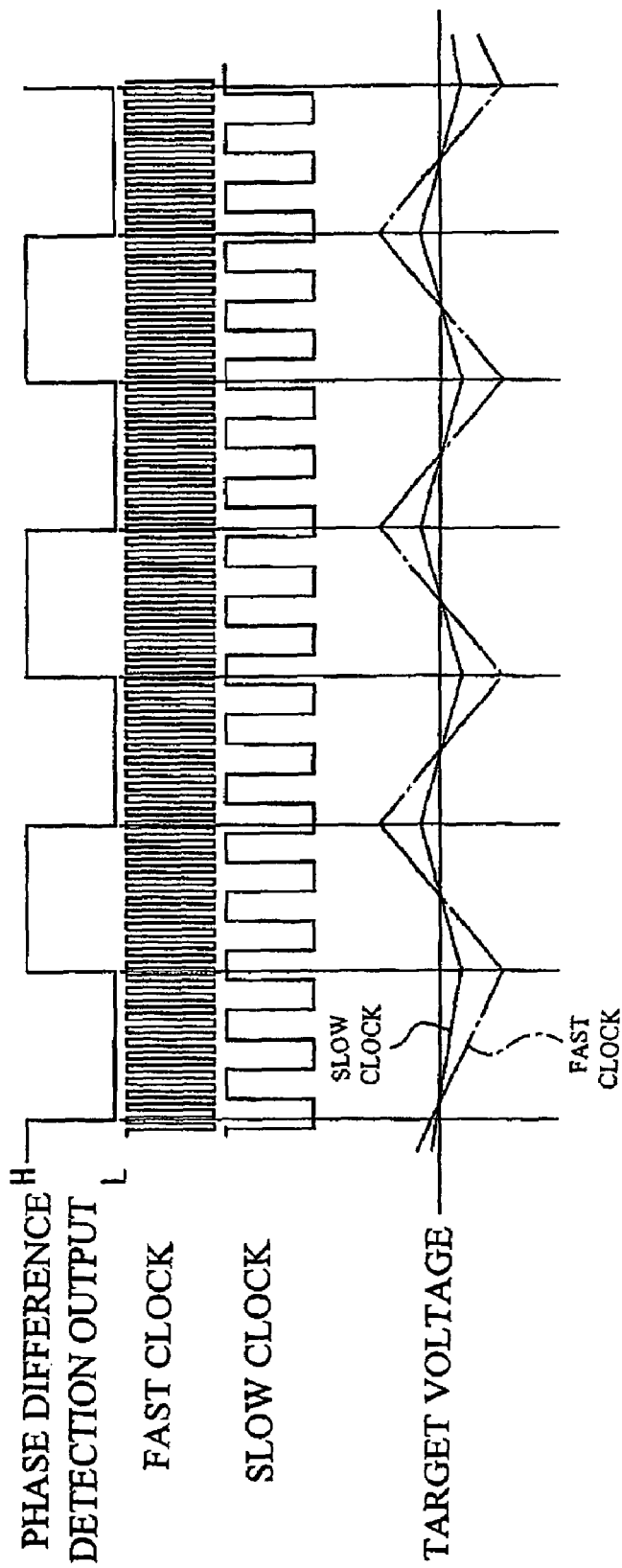
FIG. 9 is a block diagram showing the mutual relationship between a phase difference detection output, a clock signal, and an output voltage.

FIG. 9 shows the relationship between the phase difference detection output, the two clock signals with different speeds controlled by the control circuit 543, and the voltage controlled by the UD counter 544.

In FIG. 9, when "fast clock" (increasing the clock speed) is selected, the changing voltage value increases because the number of counts over a specific period of time is high, and when "slow clock" (decreasing the clock speed) is selected, the changing voltage value decreases because the number of counts over a specific period of time is low. Also, an up-count clock is inputted when the phase difference detection output is L (low) because the voltage is low in relation to the target voltage, and a down-count clock is inputted when the phase difference detection output is H (high) because the voltage is high in relation to the target voltage. These types of controls are performed based on the target voltage.

Next, the drive method for a piezoelectric actuator using the voltage adjustment circuit 54 shown in FIGS. 7B and 8 will be described with reference to the flow charts in FIGS. 10 and 11.

Figure 10:
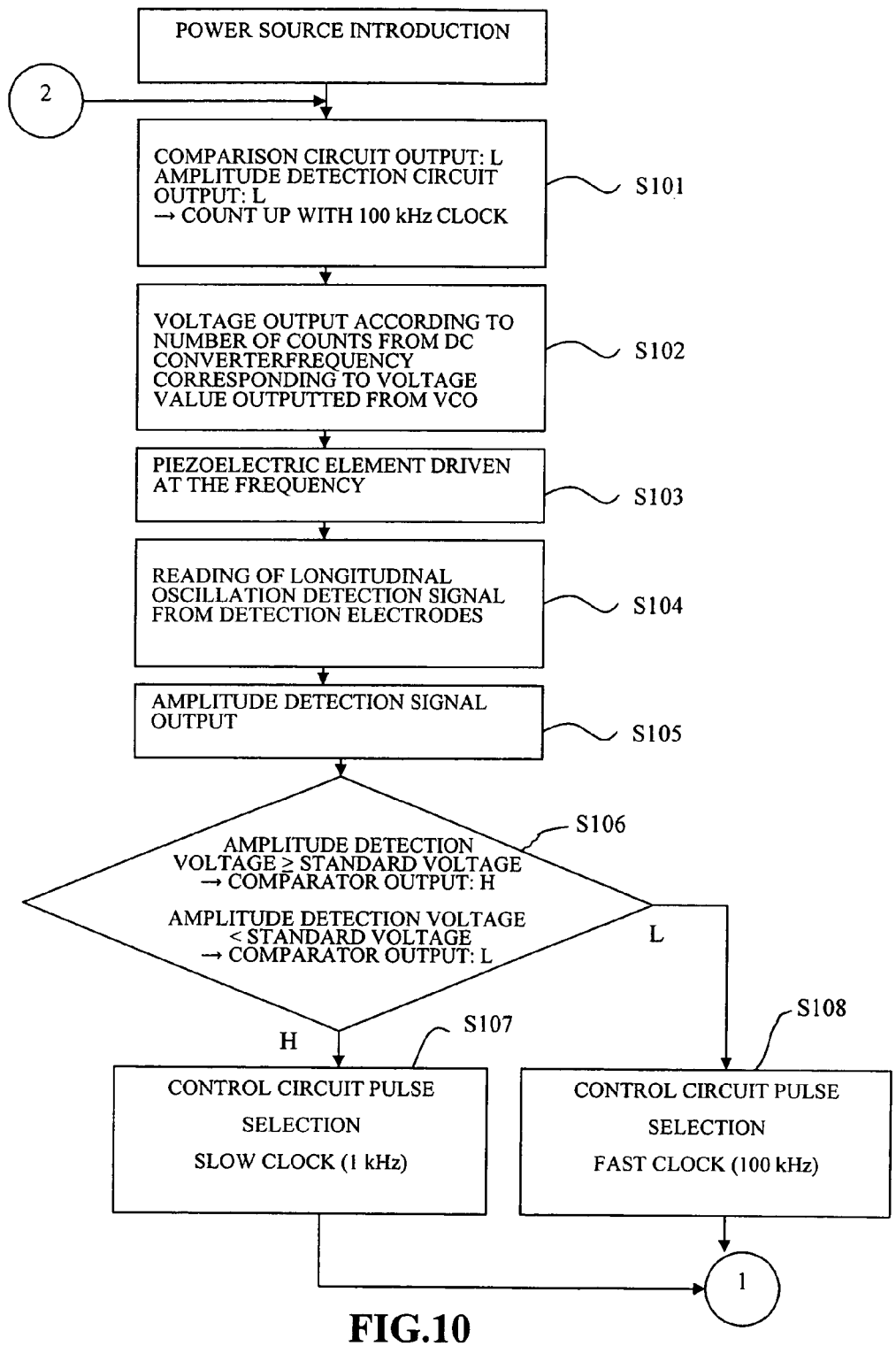
FIG. 10 is a flow chart for describing a method of driving a piezoelectric actuator by using the voltage adjustment circuit in FIG. 7B.

In FIG. 10, when power is supplied, the signal outputted from the comparison circuit 53 is L and the signal outputted from the amplitude detection circuit 57 is L, so the count goes up with a regular clock (for example, 100 kHz) (S101).

Then, voltage corresponding to the number of counts is outputted from the D/A converter 545, a frequency corresponding to the voltage value thereof is outputted from the voltage control oscillator 56 (S102), and the piezoelectric element 17 is driven at this frequency (S103).

A detection signal for longitudinal oscillation is read from the detection electrodes 19C and 19D of the piezoelectric element 17 (S104), and an amplitude detection signal is outputted (S105). The values of the amplitude detection voltage and the standard voltage are compared (S106), the clock speed is slowed by the control circuit 543 if the amplitude detection voltage is equal to or greater than the standard voltage (S107), and the clock speed is increased by the control circuit 543 if the amplitude detection voltage is less than the standard voltage (S108).

Figure 11:
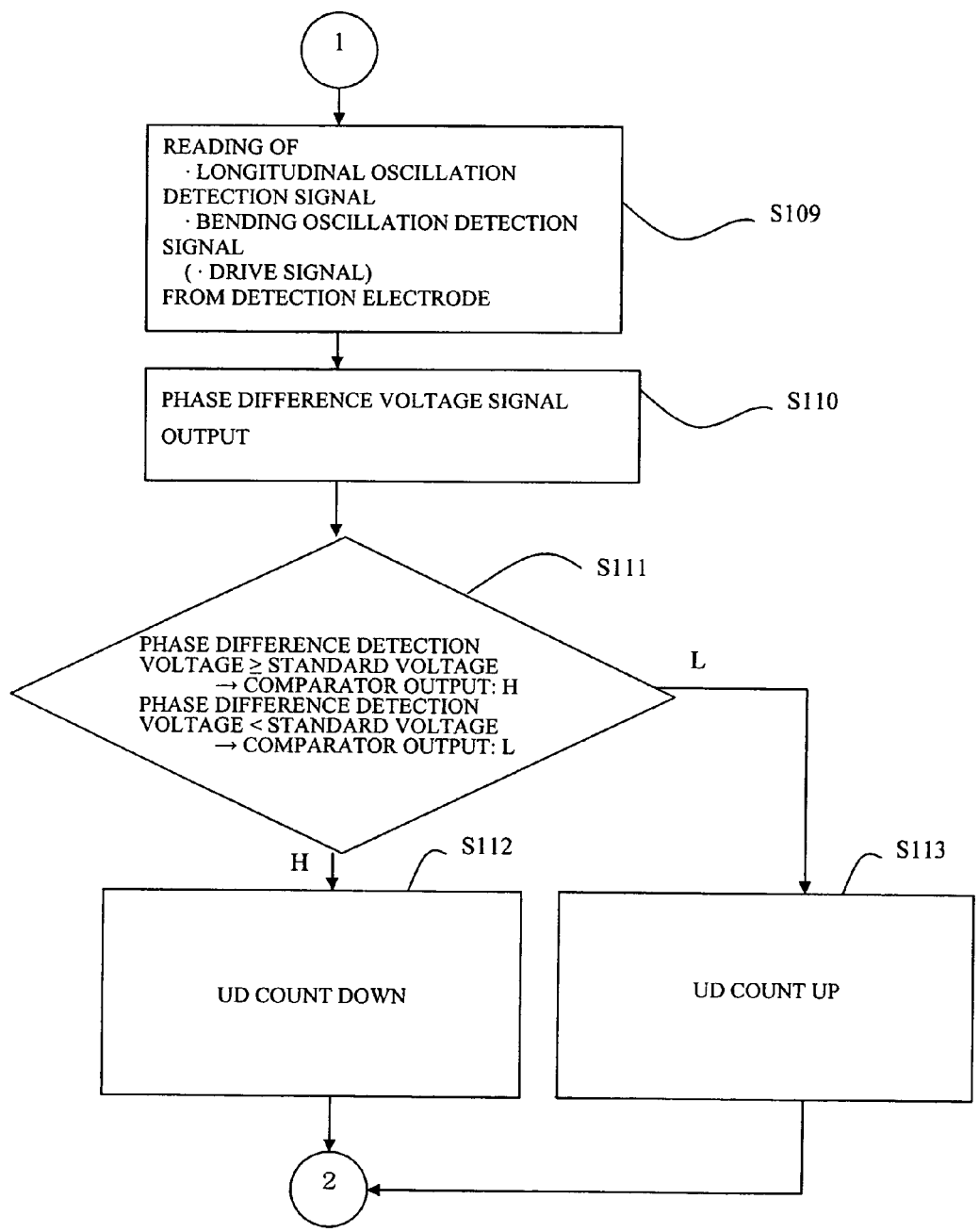
FIG. 11 is a flow chart for describing a method of driving a piezoelectric actuator by using the voltage adjustment circuit in FIG. 7B.

Then, both a longitudinal oscillation detection signal and a bending oscillation detection signal are read from the detection electrodes 19C and 19D (S109), and the phase difference voltage is outputted (S110), as shown in FIG. 11.

The phase difference detection voltage and the standard voltage are then compared (S111), the UD counter counts down (S112) and the voltage outputted to the voltage control oscillator 56 is lowered if the phase difference detection voltage is equal to or greater than the standard voltage (H), and the UD counter counts up (S113) and the voltage outputted to the voltage control oscillator 56 is raised if the phase difference detection voltage is less than the standard voltage (L). The process returns to the step shown in S101 when these steps are complete.

Next, a case in which the voltage adjustment circuit 54 has the configuration shown in FIG. 7C will be described.

Figure 12:
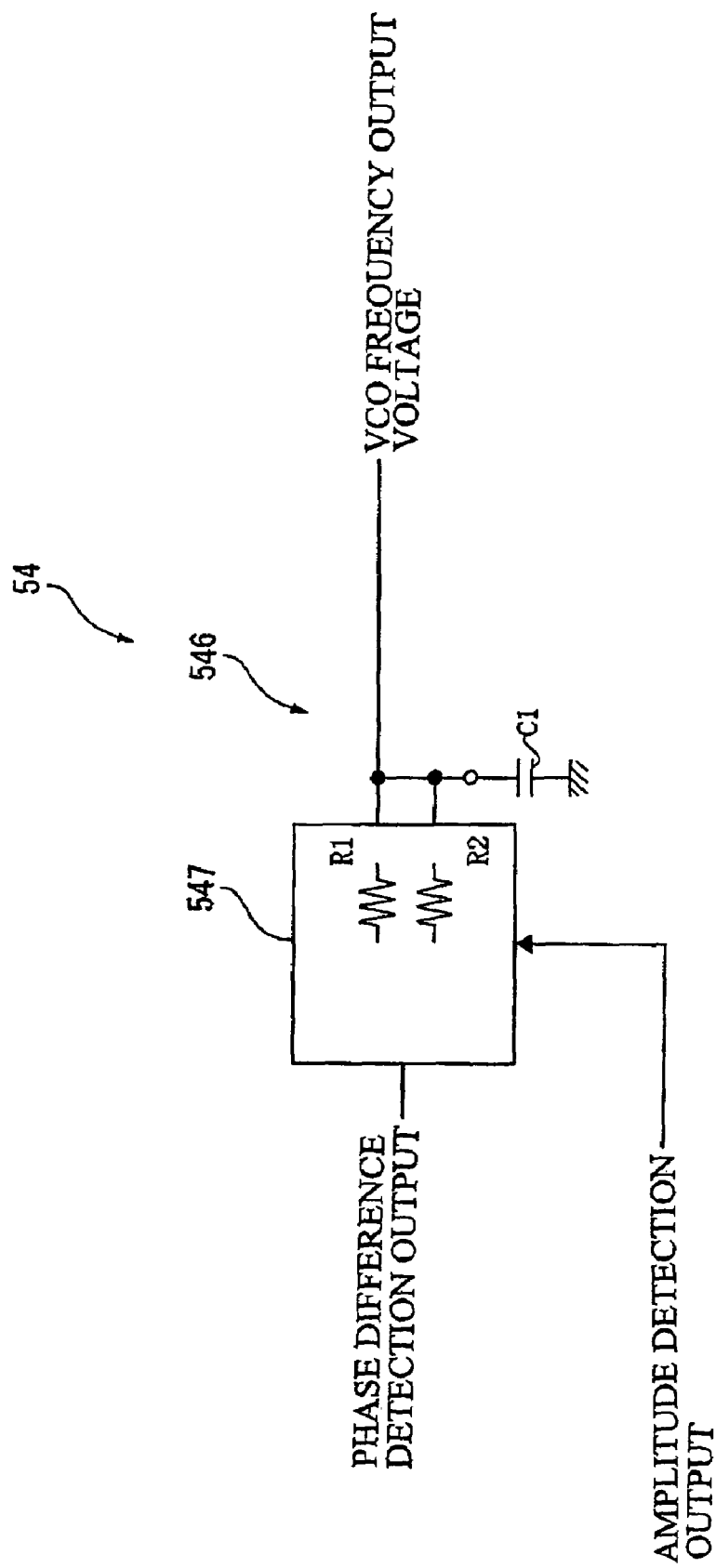
FIG. 12 is a block diagram showing the internal configuration of the voltage adjustment circuit in FIG. 7C in detail.

Another example of the voltage adjustment circuit 54 is shown in FIGS. 7C and 12.

In FIGS. 7C and 12, the voltage adjustment circuit 54 contains a loop filter 546 that has two resistances R1 and R2 with different time constants (for example, 1 msec and 100 msec) and that outputs a voltage to the voltage control oscillator 56 according to these time constants, and a control circuit 547 that selects a time constant from the loop filter 546 on the basis of the amplitude signal detected by the amplitude detection circuit 57.

The loop filter 546 contains a capacitor C1, and the voltage outputted to the voltage control oscillator 56 is adjusted by charging or discharging the capacitor C1.

The control circuit 547 is configured to select the resistance R1 for lowering the time constant and to reduce the amount of voltage outputted from the loop filter 546 when the amplitude signal is equal to or greater than the standard voltage, and to select the resistance R2 for raising the time constant and to increase the amount of voltage outputted from the loop filter 546 when the amplitude signal is less than the standard voltage.

Next, the drive method for a piezoelectric actuator using the voltage adjustment circuit 54 shown in FIGS. 7C and 12 will be described with reference to the flow charts in FIGS. 13 and 14.

Figure 13:
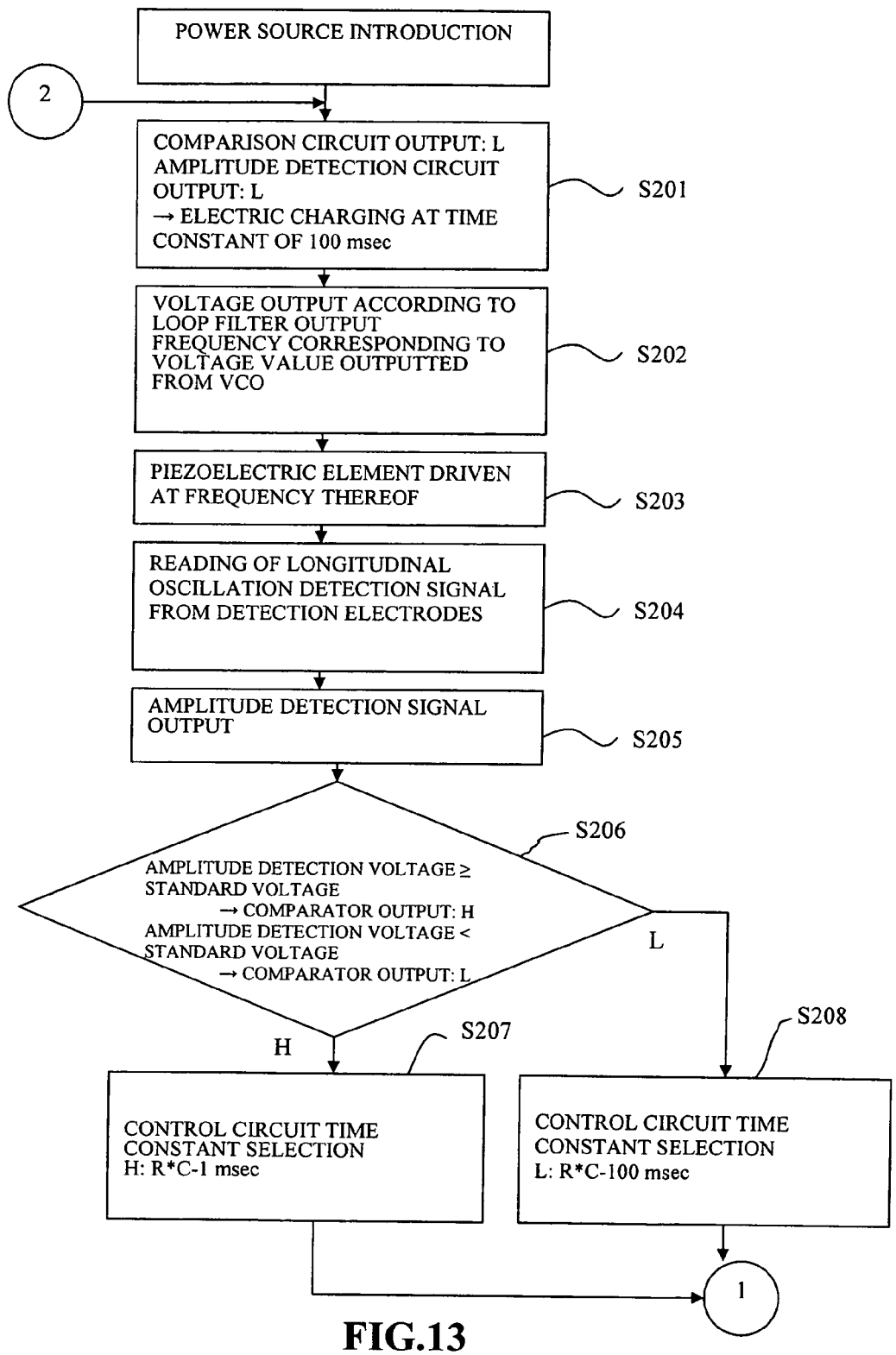
FIG. 13 is a flow chart for describing a method of driving a piezoelectric actuator by using the voltage adjustment circuit in FIG. 7C.
Figure 14:
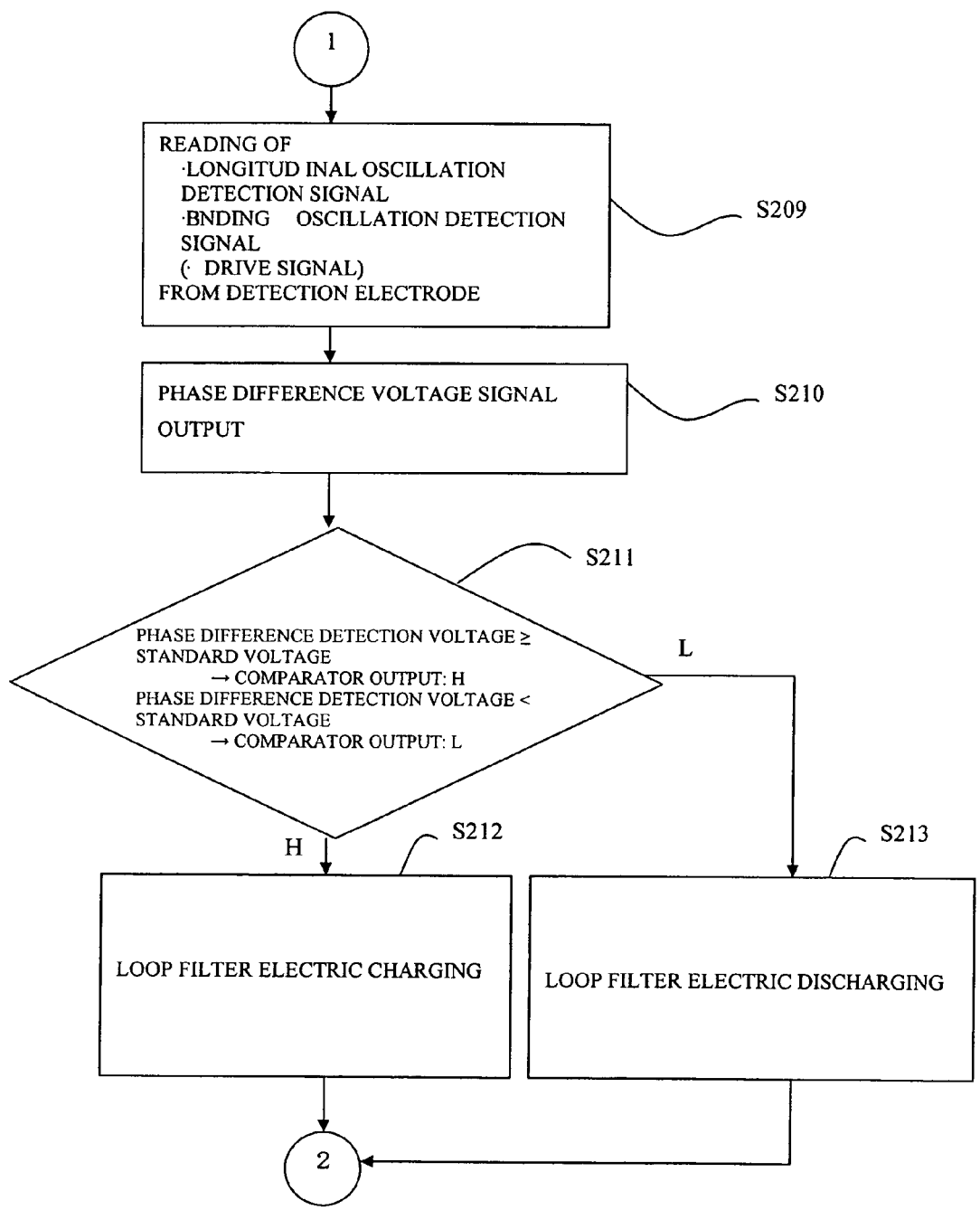
FIG. 14 is a flow chart for describing a method of driving a piezoelectric actuator by using the voltage adjustment circuit in FIG. 7C.

In FIG. 13, when power is supplied, the signal outputted from the comparison circuit 53 is L and the signal outputted by the amplitude detection circuit 57 is L, so the loop filter 546 is electrically charged at a normal time constant (for example, 100 msec) (S201). Then, voltage corresponding to the output of the loop filter 546 is outputted and the frequency corresponding to the voltage value is outputted from the voltage control oscillator 56 (S202), and the piezoelectric element 17 is driven at this frequency (S203).

Furthermore, a detection signal for longitudinal oscillation is read from the detection electrodes 19C and 19D of the piezoelectric element 17 (S204), and an amplitude detection signal is outputted (S205).

The values of the amplitude detection voltage and the standard voltage are then compared (S206), a low time constant of the loop filter 546 (for example, 1 msec) is selected by the control circuit 543 and the amount of voltage outputted from the loop filter 546 is reduced if the amplitude detection voltage is equal to or greater than the standard voltage (S207), and a high time constant of the loop filter 546 (for example, 100 msec) is selected by the control circuit 543 and the amount of voltage outputted from the loop filter 546 is increased if the amplitude detection voltage is less than the standard voltage (S208).

Then, both a longitudinal oscillation detection signal and a bending oscillation detection signal are read from the detection electrodes 19C and 19D (S209), and the phase difference voltage is outputted (S210), as shown in FIG. 13.

The phase difference detection voltage and the standard voltage are then compared (S211), the loop filter 546 is electrically charged (S212) and the voltage outputted to the voltage control oscillator 56 is lowered if the phase difference detection voltage is equal to or greater than the standard voltage (H), and the loop filter 546 is electrically discharged (S213) and the voltage outputted to the voltage control oscillator 56 is raised if the phase difference detection voltage is less than the standard voltage (L). The process returns to the step shown in S201 when these steps are complete.

4. Effects of First Embodiment

Therefore, according to the first embodiment, the following operational effects can be achieved.

(1) The drive device 50 for a piezoelectric actuator of the present embodiment contains a phase difference detection device that detects a detection signal for longitudinal oscillation and for bending oscillation from the oscillator 5, and detects the phase difference between these two signals; a frequency control device that compares the phase difference detected by the phase difference detection device with the standard phase difference value, and controls the frequency of the drive signal sent to the piezoelectric element 17 on the basis of the results of this comparison; and an amplitude detection device that detects the amplitude of the detection signal of the piezoelectric element 17, and since the frequency control device is configured to compare the amplitude with the standard amplitude value and to control the frequency of the drive signal on the basis of the results of this comparison, frequency control for the drive signal on the basis of the amplitude of the detection signal is also performed in addition to frequency control for the drive signal on the basis of the phase difference. Therefore, frequency control based on amplitude compensates the defects of frequency control based on the phase difference, the time required to achieve highly effective drive conditions is shortened to reduce power consumption, and stabilized control can be performed.

(2) Since the phase difference detection device is a phase difference/voltage conversion circuit 51 that detects the phase difference and outputs a phase difference voltage signal whose voltage value is equivalent to the phase difference, the phase difference is converted to a voltage value and the signal converted to this voltage value is outputted to the frequency control device, making it easier to achieve high-precision control with the frequency control device.

Figure 15:
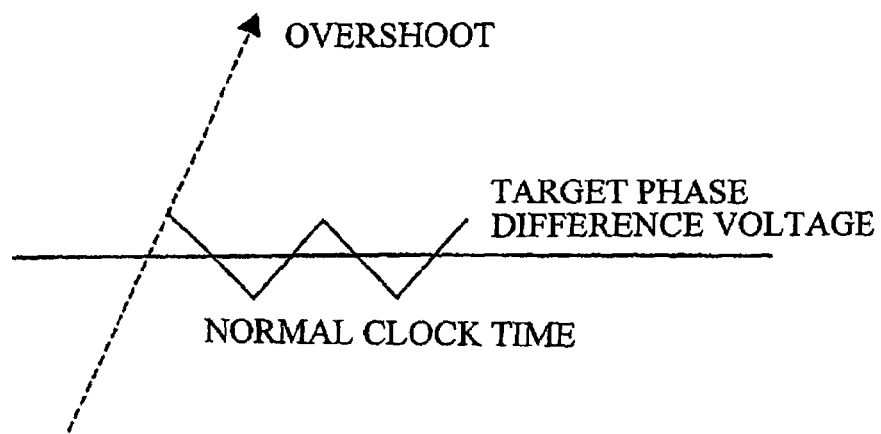
FIG. 15 is a schematic view for describing the effects of the first embodiment.

(3) The frequency control device contains a constant voltage circuit 52 that outputs a standard voltage for comparing the phase difference and a standard voltage for detecting amplitude; a comparison circuit 53 that compares the standard voltage for phase comparison outputted by the constant voltage circuit 52 with the phase difference voltage outputted from the phase difference/voltage conversion circuit 51, and outputs a comparison result signal; and a drive control section that receives the comparison result signal outputted by the comparison circuit 53 and controls the frequency of the drive signal sent to the piezoelectric element 17, wherein the amplitude detection device is an amplitude detection circuit 57 that detects amplitude by comparing the standard voltage for amplitude detection outputted by the constant voltage circuit 52 with the detection signal of the piezoelectric element 17, and wherein the drive control section has a configuration for decreasing the rate of change in frequency over a specific period of time when the amplitude detection voltage detected by the amplitude detection circuit 57 is equal to greater than the standard voltage, and increasing the rate of change in frequency over a specific period of time when the amplitude detection voltage detected by the amplitude detection circuit 57 is less than the standard voltage; therefore, when the frequency of the drive signal sent to the piezoelectric element 17 is controlled in the drive control section, the rate of change in frequency is reduced when the amplitude detection voltage is equal to or greater than the standard voltage, and the rate of change in frequency is increased when the amplitude detection voltage is less than the standard voltage, so the time needed to achieve highly efficient drive conditions is reduced, the control voltage becomes less erratic in the vicinity of the target phase difference voltage, and stabilized drive control can be performed without any overshooting, as shown in FIG. 15.

Therefore, drive control for the piezoelectric actuator 10 can be performed with high precision by employing a configuration wherein the rate of change in the frequency of the drive signal is adjusted based on the results of comparing the amplitude detection voltage and the standard voltage.

(4) The drive control section is configured with a drive circuit 55 for supplying a drive signal to the piezoelectric element 17, a voltage control oscillator 56 for outputting a frequency corresponding to the voltage inputted to the drive circuit 55, and a voltage adjustment circuit 54 for adjusting the voltage supplied to the voltage control oscillator 56 on the basis of the results of comparing the amplitude and the standard amplitude value; therefore, drive control for the piezoelectric actuator 10 can be performed with high precision by employing the voltage control oscillator 56 and the voltage adjustment circuit 54.

(5) If the voltage adjustment circuit 54 is configured with a voltage adjustment section 541 for adjusting the voltage outputted to the voltage control oscillator 56, a clock circuit 542 capable of varying the frequency of the outputted clock signal, and a control circuit 543 that outputs a signal to the voltage adjustment section 541 according to the clock signal outputted by the clock circuit 542 and that varies the frequency of the clock signal on the basis of the amplitude signal detected by the amplitude detection circuit 57, then the structure of the drive device 50 can be simplified because the clock circuit 542 widely used as a control circuit is utilized. Particularly, since the voltage adjustment section 541 is configured with the UD counter 544, an IC is beneficial because externally mounted components are unnecessary and the sweep rate can be easily varied.

(6) Since the control circuit 543 has a configuration wherein the clock signal outputted from the clock circuit 542 is made slower when the amplitude signal is equal to or greater than the standard voltage and the clock signal outputted from the clock circuit 542 is made faster when the amplitude signal is less than the standard voltage, control with a higher degree of precision as well as stabilized drive control can be performed because the speed of the clock signal is determined by comparing the amplitude signal and the standard voltage.

(7) If the voltage adjustment circuit 54 is configured with a loop filter 546 that has two different time constants and that is designed for outputting voltage to the voltage control oscillator according to the time constant, and with a control circuit 547 that selects the time constant of the loop filter 546 on the basis of the amplitude signal detected by the amplitude detection circuit 57, then the loop filter 546 widely used as a phase synchronization circuit can be utilized to configure the drive device 50, it is easy to use a configuration with discrete parts, the structure of the drive device 50 can be simplified, and the cost of the device can be reduced.

(8) Since the control circuit 543 has a configuration wherein the amount of voltage outputted from the loop filter 546 is reduced when the amplitude signal is equal to or greater than the standard voltage, and the amount of voltage outputted from the loop filter 546 is increased when the amplitude signal is less than the standard voltage, control with a high degree of precision can be performed because the amount of voltage outputted by the loop filter 546 is adjusted by comparing the amplitude signal and the standard voltage.

(9) The structure of the control circuit 543 as such can be simplified because the control circuit 543 is capable of selecting the fast clock and the slow clock.

(10) The structure of the control circuit 547 as such can be simplified because the control circuit 547 is capable of switching the loop filter 546 with two different time constants.

(11) Since the electronic timepiece is configured with a piezoelectric actuator 10 having an oscillator 5 that has a piezoelectric element 17, and also having convexities 20 that are provided to the oscillator 5 and come into contact with the driven object, and is also configured with a drive device 50 with the configuration previously described, and a date display mechanism 30 driven by the piezoelectric actuator 10, it is possible to provide an electronic timepiece wherein power consumption is reduced and stabilized control can be achieved in a short amount of time.

Second Embodiment

The second embodiment of the present invention will now be described with reference to FIGS. 16 through 20.

The second embodiment differs from the first embodiment in that the drive device 50 for a piezoelectric actuator is applied to a portable electronic device (portable device), but the configuration of the drive device 50 for a piezoelectric actuator is the same as in the first embodiment. In the description of the second embodiment, the same structural elements as in the first embodiment are denoted by the same symbols, and descriptions thereof are omitted or simplified.

5. Configuration of Second Embodiment

In the second embodiment, the portable device is a noncontact IC card having a clearing function, and this IC card is provided with a piezoelectric actuator 10 and a drive device 50.

Figure 16:
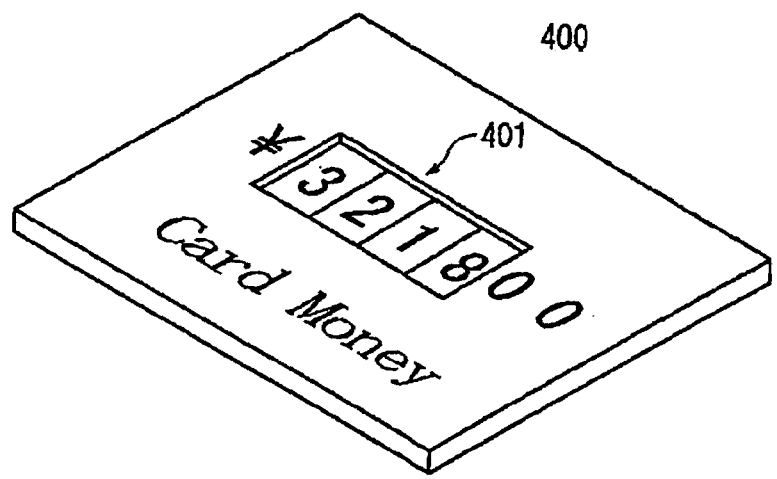
FIG. 16 is an external perspective view of a portable device (noncontact IC card) relating to the second embodiment of the present invention.

FIG. 16 is an external perspective view of the noncontact IC card.

In FIG. 16, the front surface of the noncontact IC card 400 is provided with a balance display counter 401 for displaying the balance.

Figure 17:
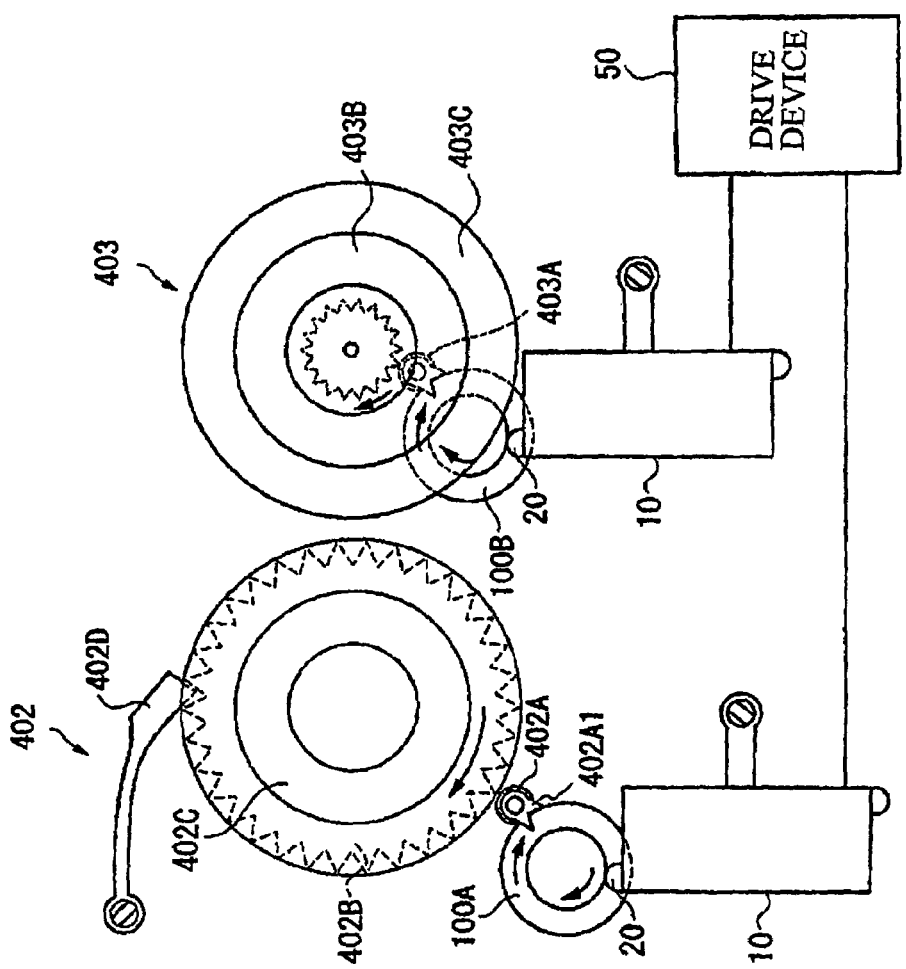
FIG. 17 is a detailed structural front view showing a high-order display section of the noncontact IC card.

The balance display counter 401 displays the balance in four digits, and contains a high-order display section 402 for displaying two high-order digits, and a low-order display section 403 for displaying two low-order digits, as shown in FIG. 17.

Figure 18:
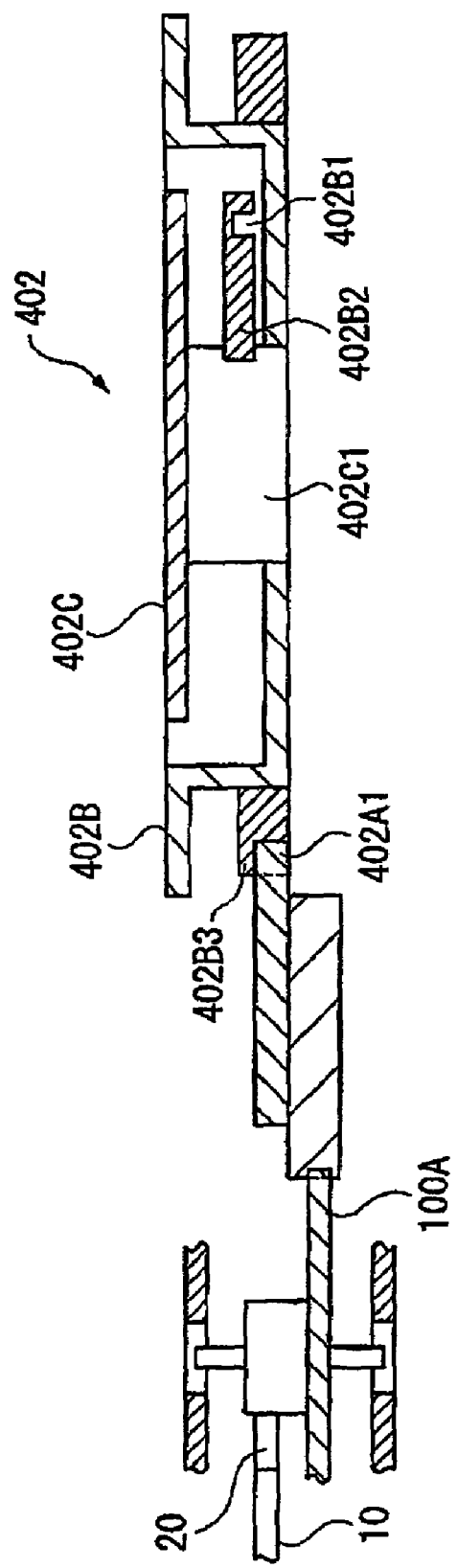
FIG. 18 is a detailed structural side view of the high-order display section.

FIG. 18 is a side view showing the configuration of the high-order display section 402 in detail.

In FIG. 18, the high-order display section 402 is linked to the piezoelectric actuator 10 via a rotor 100A and is driven by the driving force of the rotor 100A. The main section of the high-order display section 402 contains a drive gear 402A that has a turning finger 402A1 and that rotates once when the rotor 100A rotates once, a first high-order display wheel 402B that rotates one graduation for every rotation of the drive gear 402A, a second high-order display wheel 402C that rotates one graduation for every rotation of the first high-order display wheel 402B, and a fixing member 402D for fixing the first high-order display wheel 402B in place when the first high-order display wheel 402B is not rotating. The second high-order display wheel 402B is also provided with a fixing member (not shown) for fixing the second high-order display wheel 402C in place.

The drive gear 402A rotates once when the rotor 100A rotates makes 1/n rotations. The turning finger 402A1 interlocks with a turning gear 402B3 in the first high-order display wheel 402B, and the first high-order display wheel 402B rotates by one graduation. Furthermore, when the first high-order display wheel 402B rotates once, a turning pin 402B1 provided to the first high-order display wheel 402B causes a turning gear 402B2 to rotate, which causes a turning gear 402C1 in the second high-order display wheel 402C interlocked with the turning gear 402B2 to rotate and the second high-order display wheel 402C to rotate by one graduation.

Figure 19:
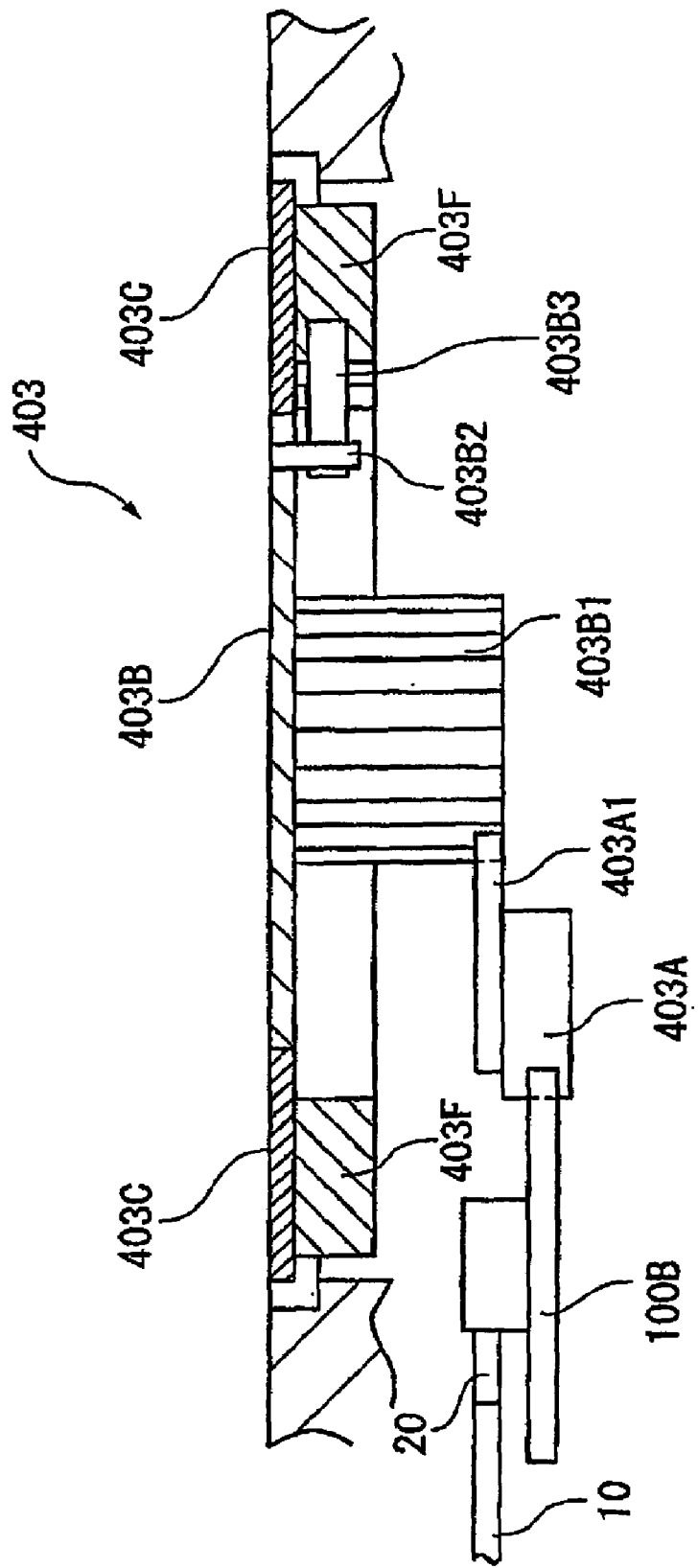
FIG. 19 is a detailed structural side view of a low-order display section.
Figure 20:
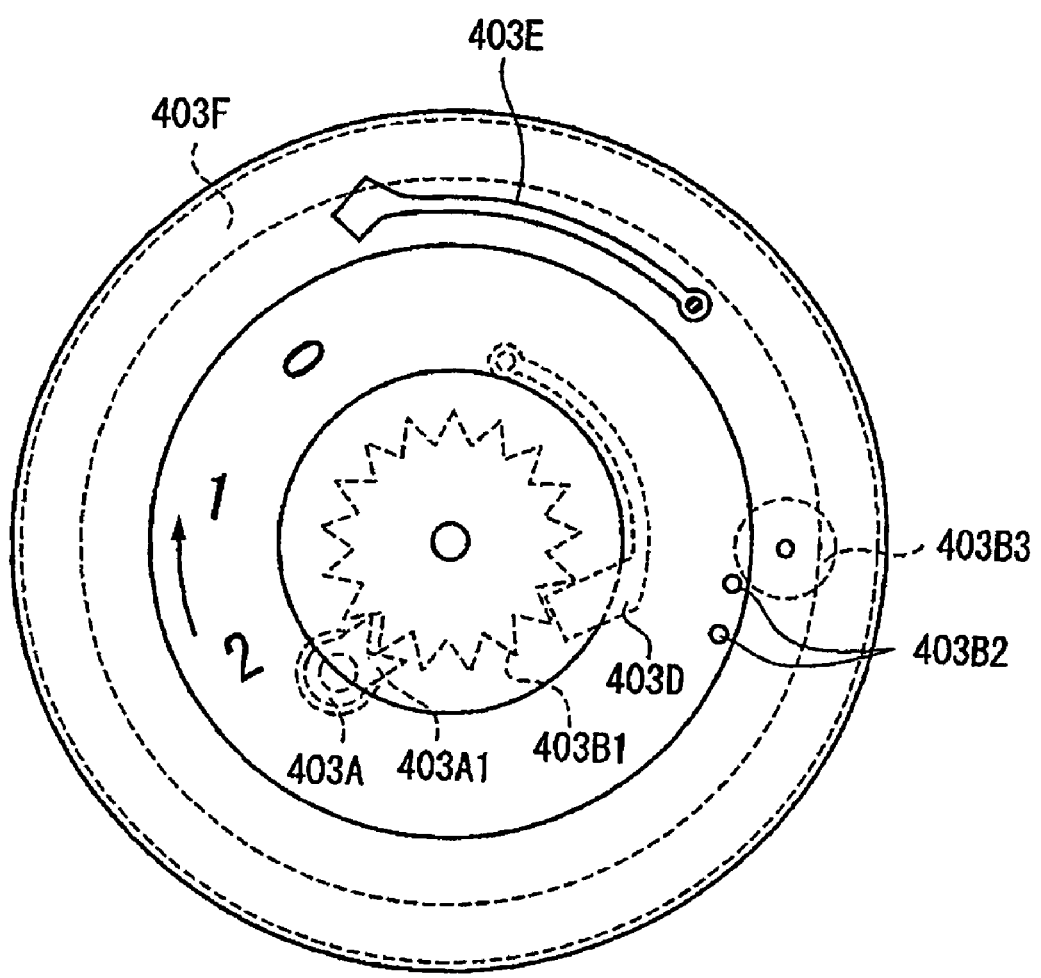
FIG. 20 is a detailed structural front view of the low-order display section.
Figure 21:
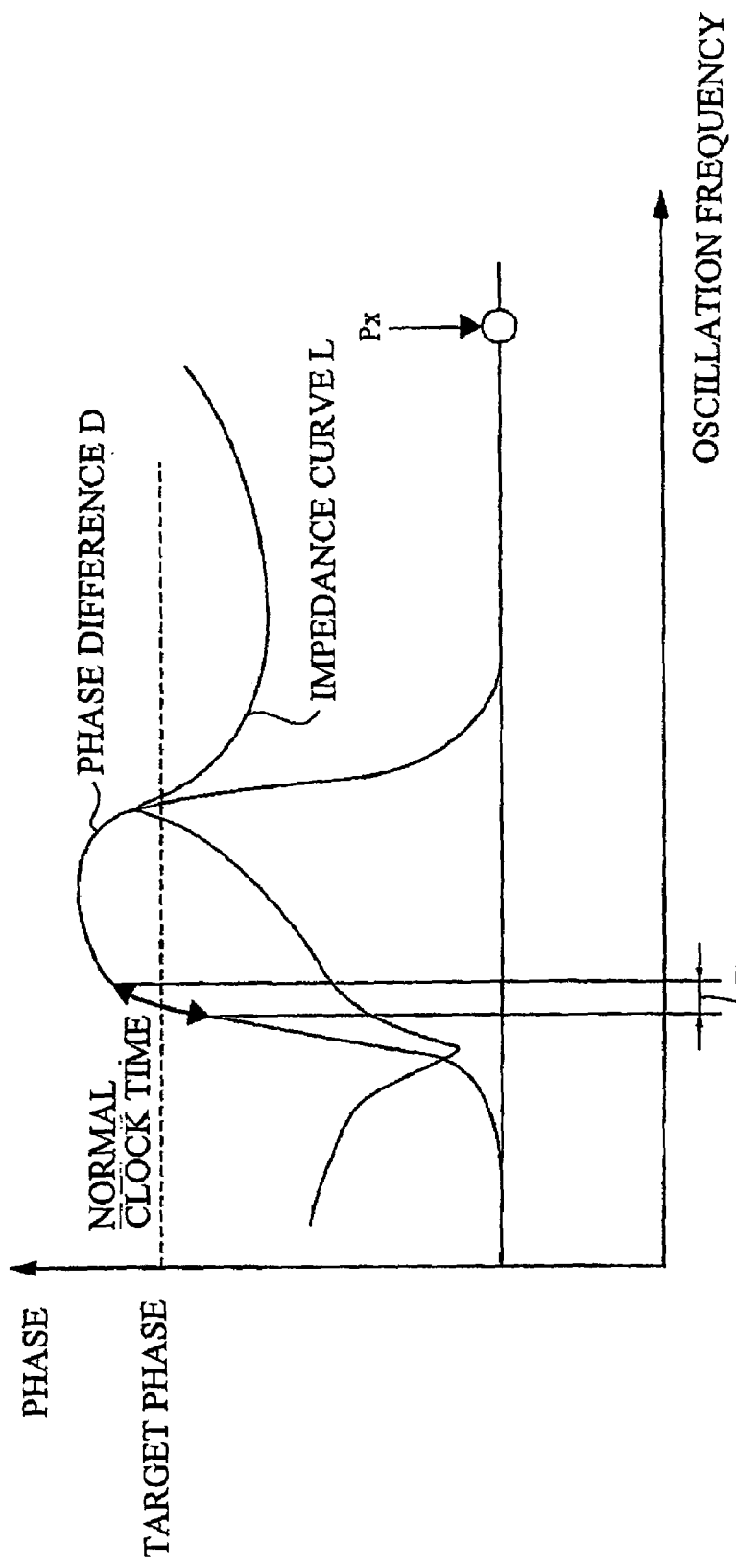
FIG. 21 is a schematic view for describing the problems of a conventional example.

FIG. 19 is a side view showing the configuration of the low-order display section 403 in detail, and FIG. 20 is a front view showing the configuration of the low-order display section 403 in detail.

In FIGS. 19 and 20, the low-order display section 403 is linked to the piezoelectric actuator 10 via a rotor 100B and is driven by the driving force of the rotor 100B. The main section of the low-order display section 403 contains a drive gear 403A that has a turning finger 403A1 and that rotates once when the rotor 100B makes 1/n rotations, a first low-order display wheel 403B that rotates one graduation for every rotation of the drive gear 403A, and a second low-order display wheel 403C that rotates one graduation for every rotation of the first low-order display wheel 403B.

The first low-order display wheel 403B has a turning gear 403B1 interlocking with the turning finger 403A1 of the drive gear 403A, and rotates one graduation for every rotation of the drive gear 403A. The first low-order display wheel 403B is provided with a turning pin 403B2 which causes the turning gear 403B to rotate and the second low-order display wheel 403C to rotate one graduation every time the first low-order display wheel 403B rotates once. In this case, a fixing member 403D of the first low-order display wheel 403B interlocks with the turning gear 403B1 and fixes the first low-order display wheel 403B in place when it is not rotating.

A fixing member 403E for the second low-order display wheel 403C interlocks with a turning gear 403F and fixes the second low-order display wheel 403C in place when the second low-order display wheel 403C is not rotating. In this case, the actuator 10 is adapted to be driven synchronously by the drive device 50, and the drive device 50 is driven by an IC card chip (not shown) by the input of a drive control signal that corresponds to the settled amount of money.

The specific configuration of the drive device 50 of the second embodiment is the same as that of the drive device 50 in the first embodiment, so a description thereof is omitted.

According to the configuration described above, the balance can be mechanically displayed even in a portable device such as a noncontact IC card, and during times other than when the drive is active, display can be performed without the need for a power source, making it possible to maintain the display at low commercial power up until the time the power source expires.

6. Effects of Second Embodiment

Consequently, in the second embodiment of the present invention, the following operational effects can be achieved in addition to the operational effects (1) through (10) in the first embodiment.

(12) Since the portable device contains a piezoelectric actuator 10 having an oscillator 5 that has a piezoelectric element 17, and a contact section 20 that is provided to the oscillator 5 and comes into contact with the driven object, and also contains a drive device 50 for the piezoelectric actuator with the configuration previously described, it is possible to provide a portable device wherein power consumption is reduced and stabilized control can be achieved in a short period of time.

The present invention is not limited to the previously described embodiments and may contain all other modifications, improvements, and the like that allow the objectives of the present invention to be achieved.

For example, in both embodiments, the phase difference is determined from detection signals of longitudinal oscillation and bending oscillation detected by the detection electrodes 19C and 19D at two locations on the piezoelectric element 17, and the driving of the piezoelectric actuator is controlled based on this phase difference, but the present invention may also be configured such that the phase difference between the detection signal detected by the piezoelectric element 17 and the drive signal outputted to the piezoelectric element 17 is determined, and the driving of the piezoelectric actuator is controlled on the basis of this phase difference.

Also, the control circuit 543 shown in FIG. 7B is capable of selecting a fast clock and a slow clock and switching the speed in two steps, but the present invention is not limited to two-step switching and may also be configured to switch in three steps, four steps, or more.

Furthermore, the control circuit 547 shown in FIG. 7C is capable of switching a loop filter 546 having two different time constants, but the present invention may also be configured to be capable of switching a loop filter 546 having three or four different time constants or more.

Also, both embodiments have a configuration wherein the UD counter 544 was set to a specific voltage and the voltage was increased or reduced in relation to this specific voltage, but in the present invention, the UD counter 544 may also be started from zero.

Furthermore, each device in the clock signal may be configured from various logical elements or other such hardware, or may be configured such that the devices are executed by providing a computer that contains a CPU, (central processing unit), memory (storage device), and the like to a timepiece or portable device, and incorporating specific programs or data (data stored in the storage sections) into this computer.

The programs and data should be stored in advance in RAM, ROM, or other such memory incorporated into the timepiece or portable device. Also, for example, specific control programs or data may be installed in the timepiece or portable device via the Internet or another such communication device, or a CD-ROM, memory card, or other such storage medium. The devices may be executed by causing the CPU or the like to operate with a program stored in the memory. To install a specific program or the like in the timepiece or portable device, a memory card, CD-ROM, or the like may be directly inserted into the timepiece or portable device, or a device for reading these storage media may be connected to the timepiece or portable device by external mounting. Furthermore, a LAN cable, phone line, or the like may be connected to the timepiece or portable device to supply and install a program or the like via wired communication, or the program may be supplied and installed via wireless communication.

If a control program or the like provided by a storage medium, the Internet, or another such communication means is incorporated into the timepiece or portable device, the functions of the present invention can be executed merely by modifying the program, so the control program can be selected and incorporated during factory shipping or as desired by the user. In this case, various timepieces and portable devices with different control systems can be manufactured merely by modifying the program, making it possible to share the components and to greatly reduce manufacturing costs when variations are developed.

Also, the present invention is not limited to being applied to the electronic timepiece in the first embodiment or the noncontact IC card in the second embodiment. Specifically, the electronic device employing the drive method or drive device for a piezoelectric actuator of the present invention is not limited to a wristwatch, standing clock, wall clock, or other such electronic timepieces, and the present invention can be applied to various electronic devices and is particularly suitable for portable electronic devices for which compactness is a requirement. Examples of such electronic devices include phones, portable phones, personal computers, portable information terminals (PDA), cameras, and other devices with timepiece functions. The present invention can also be applied to cameras, digital cameras, video cameras, portable phones with camera functions, and other such electronic devices that do not have a timepiece function. When the present invention is applied to electronic devices with a camera function, the drive device of the present invention can be used to drive a focusing mechanism, a zoom mechanism, a lens adjusting mechanism, or the like. Furthermore, the drive device of the present invention may also be used in a drive mechanism for a meter pointer in a measurement device, a drive mechanism in a mobile toy, a drive mechanism for a meter pointer in an instrument panel in an automobile or the like, a piezoelectric buzzer, a printer inkjet head, an ultrasonic motor, or the like.

Also, a piezoelectric actuator was used to drive the date display mechanism of the electronic timepiece 1 in the first embodiment, but is not limited thereto and may also be used to drive time display hands (pointers) in the electronic timepiece 1. Thus, replacing the stepping motor normally used to drive the pointers with a piezoelectric actuator allows the electronic timepiece 1 to be designed as a single thin layer and to be made highly antimagnetic because the piezoelectric actuator is less susceptible to magnetism than the stepping motor.

Also, in both the embodiments, the frequency of the drive signal was controlled based on the phase difference between the detection signal and the drive signal or the phase difference between multiple detection signals, but the frequency of the drive signal may also be controlled based on the value of an electric current flowing through the piezoelectric actuator, for example, by providing resistance to the driver for driving the piezoelectric actuator and detecting the change in the value of the electric current running through the piezoelectric actuator as a voltage value.

Furthermore, when a plurality of detection signals is detected, the increase and decrease in the frequency of the drive signal may be controlled via the amplitude of a certain detection signal, and the rate of change in the increase and decrease of the frequency of the drive signal may be controlled by comparing the amplitude of another detection signal with the standard amplitude value.

Also, the increase and decrease in the frequency of the drive signal may be controlled via the amplitude of the detection signal, and the rate of change in the increase and decrease of the frequency of the drive signal may be controlled via the phase difference between the signals and the value of an electric current flowing through the piezoelectric actuator.

Furthermore, when a plurality of detection signals is detected, the amplitude of one predetermined detection signal may be detected to control the frequency of the drive signal, but frequency control may also be performed based on the amplitude of a detection signal with the largest change in amplitude when the amplitudes of multiple detection signals are detected and stored over a specific period immediately after driving. In this case, control can be performed based on the detection signal with the largest change in amplitude, so the change can be reliably detected and effective control performed.

What is claimed is:

1. A drive method for a piezoelectric actuator comprising:
preparing the piezoelectric actuator having an oscillator being configured to oscillate due to the supply of a drive signal with a specific frequency to a piezoelectric element, and contact sections being convexities being provided on opposite sides of the oscillator and being configured to contact a driven object;
detecting a first detection signal indicating an oscillating state of the oscillator and controlling a frequency of the drive signal sent to the piezoelectric element based on the first detection signal and the drive signal, or based on the first detection signal;
detecting the amplitude of the first detection signal;
comparing the amplitude and a standard amplitude value of the first detection signal; and
controlling the frequency of the drive signal based on the results of comparing the amplitude and the standard amplitude value of the first detection signal.

2. The drive method for a piezoelectric actuator according to claim 1, wherein controlling the frequency of the drive signal is controlling the increase or decrease in the frequency of the drive signal, or controlling the rate of change of the increase or decrease in the frequency of the drive signal.

3. The drive method for a piezoelectric actuator according to claim 2, wherein the frequency of the drive signal is increased or decreased based on the first detection signal and the drive signal or based on the first detection signal, and the rate of change of the increase or decrease in the frequency of the drive signal is controlled based on the results of comparing the amplitude and the standard amplitude value.

4. The drive method for a piezoelectric actuator according to claim 3, wherein the rate of change of the increase or decrease in the frequency of the drive signal is reduced when the amplitude and the standard amplitude value are compared and the amplitude is equal to or greater than the standard amplitude value, and the rate of change of the increase or decrease in the frequency of the drive signal is increased when the amplitude and the standard amplitude value are compared and the amplitude is less than the standard amplitude value.

5. The drive method for a piezoelectric actuator according to claim 1, further comprising
detecting the phase difference between a second detection signal outputted from the oscillator indicating the oscillating state of the oscillator and the drive signal, and controlling the frequency of a drive signal sent to the piezoelectric element based on the results of comparing the phase difference and a standard phase difference value,
detecting the amplitude of the second detection signal,
comparing the amplitude and the standard amplitude value of the second detection signal, and
controlling the frequency of the drive signal based on the results of comparing the amplitude and the standard amplitude value of the second detection signal.

6. The drive method for a piezoelectric actuator according to claim 1, further comprising
detecting a plurality of detection signals outputted from the oscillator indicating the oscillating state of the oscillator,
detecting the phase differences among the plurality of detection signals,
controlling the frequency of the drive signal sent to the piezoelectric element based on the results of comparing the phase differences and the standard phase differences value of the plurality of detection signals,
detecting the amplitude of at least one detection signal from among the plurality of detection signals,
comparing the amplitude and the standard amplitude value of the at least one detection signal, and
controlling the frequency of the drive signal based on the results of comparing the amplitude and the standard amplitude value of the first detection signal.

7. The drive method for a piezoelectric actuator according to claim 1, wherein
the oscillator oscillates in a first oscillation mode and a second oscillation mode due to the supply of the drive signal with a specific frequency to a piezoelectric element, and
the detection signal is outputted from the oscillator indicating the oscillating state in the first oscillation mode and/or the second oscillation mode.

8. A piezoelectric actuator comprising:
a piezoelectric element having an oscillator and contact sections being convexities being arranged on opposite sides of the piezoelectric element, at least one of the contact sections being arranged to contact a driven object; and
a drive device being configured to supply a drive signal with a specific frequency to the piezoelectric element to oscillate the oscillator, the drive device having
a frequency control device being configured to control the frequency of the drive signal, and
an amplitude detection circuit being configured to detect the amplitude of a detection signal,
the frequency control device being configured to detect a detection signal indicating the oscillating state of the oscillator and to control the frequency of the drive signal based on the detection signal and the drive signal, or based on the detection signal,
the amplitude and a standard amplitude value are compared, and
the frequency of the drive signal is controlled based on the results of this comparison.

9. A piezoelectric actuator comprising:
a piezoelectric element having an oscillator; and
a drive device being configured to supply a drive signal with a specific frequency to the piezoelectric element to oscillate the oscillator, the drive device having
a frequency control device being configured to control the frequency of the drive signal, and
an amplitude detection circuit being configured to detect the amplitude of a detection signal,
the frequency control device including
a frequency increase/decrease control device controlling the increase or decrease in the frequency of the drive signal, and
a frequency increase/decrease rate control device controlling the rate of change of the increase or decrease in the frequency of the drive signal,
either one of the frequency increase/decrease control device or frequency increase/decrease rate control device detecting a detection signal indicating the oscillating state of the oscillator and controlling the frequency of the drive signal on the basis of the detection signal and the drive signal, or on the basis of the detection signal, and the other one of the frequency increase/decrease control device or frequency increase/decrease rate control device comparing the amplitude and the standard amplitude value and controlling the frequency of the drive signal on the basis of the results of this comparison.

10. The piezoelectric actuator according to claim 9, wherein
the frequency increase/decrease control device increases or decreases the frequency of the drive signal on the basis of the detection signal and the drive signal, or on the basis of the detection signal, and
the frequency increase/decrease rate control device controls the rate of change of the increase or decrease in the frequency of the drive signal on the basis of the results of comparing the amplitude and the standard amplitude value.

11. The piezoelectric actuator according to claim 9, further comprising
a phase difference detection device detecting the detection signal that indicates the oscillating state of the oscillator and detecting the phase difference between the detection signal and the drive signal or the phase difference between a plurality of detection signals, wherein
the frequency control device compares the phase difference detected by the phase difference detection device with a standard phase difference value and controls the frequency of the drive signal sent to the piezoelectric element on the basis of the results of this comparison, and also compares the amplitude and the standard amplitude value and controls the frequency of the drive signal on the basis of the results of this comparison.

12. The piezoelectric actuator according to claim 11, wherein the phase difference detection device is a phase difference/voltage conversion circuit that detects the phase difference and outputs a phase difference voltage signal whose voltage value corresponds to the phase difference.

13. A piezoelectric actuator comprising:
a piezoelectric element having an oscillator; and
a drive device being configured to supply a drive signal with a specific frequency to the piezoelectric element to oscillate the oscillator, the drive device having
a frequency control device being configured to control the frequency of the drive signal, and
an amplitude detection circuit being configured to detect the amplitude of a detection signal, and
the frequency control device being configured to detect a detection signal indicating the oscillating state of the oscillator and to control the frequency of the drive signal based on results of comparing the amplitude of the detection signal and a standard amplitude value,
the frequency control device including
a constant voltage circuit outputting a standard voltage for phase difference comparison and a standard voltage for amplitude detection,
a comparison circuit being configured to compare the standard voltage for phase difference comparison outputted by the constant voltage circuit with a phase difference voltage outputted from a phase difference/voltage conversion circuit, and to output a comparison result signal, and
a drive control section being configured to receive the comparison result signal outputted by the comparison circuit and to control the frequency of the drive signal sent to the piezoelectric element, the amplitude detection circuit being configured to detect amplitude by comparing the standard voltage for amplitude detection outputted by the constant voltage circuit with the detection signal, and
the drive control section having functions to decrease the rate of change in frequency over a specific period of time when the amplitude detection voltage detected by the amplitude detection circuit is equal to or greater than the standard voltage for amplitude detection, and to increase the rate of change in frequency over a specific period of time when the amplitude detection voltage detected by the amplitude detection circuit is less than the standard voltage for amplitude detection.

14. The piezoelectric actuator according to claim 13, wherein the drive control section has a drive circuit to supply the drive signal to the piezoelectric element, a voltage control oscillator to output a frequency corresponding to the voltage inputted to the drive circuit, and a voltage adjustment circuit to adjust the voltage supplied to the voltage control oscillator on the basis of the results of comparing the amplitude and the standard amplitude value.

15. The piezoelectric actuator according to claim 14, wherein the voltage adjustment circuit includes
a voltage adjustment section to adjust the voltage outputted to the voltage control oscillator,
a clock circuit configured to vary the frequency of an outputted clock signal, and
a control circuit to output a signal to the voltage adjustment section according to the clock signal outputted by the clock circuit, and to vary the frequency of the clock signal on the basis of the amplitude signal detected by the amplitude detection circuit.

16. The piezoelectric actuator according to claim 15, wherein the control circuit slows the clock signal outputted from the clock circuit when the amplitude signal is equal to or greater than the standard voltage for amplitude detection, and speeds up the clock signal outputted from the clock circuit when the amplitude signal is less than the standard voltage for amplitude detection.

17. The piezoelectric actuator according to claim 14, wherein the voltage adjustment circuit includes
a loop filter that has different time constants and that outputs a voltage to the voltage control oscillator according to each of the time constants, and
a control circuit to select a time constant from the loop filter on the basis of the amplitude signal detected by the amplitude detection circuit.

18. The piezoelectric actuator according to claim 17, wherein the control circuit decreases the amount of voltage outputted from the loop filter when the amplitude signal is equal to or greater than the standard voltage for amplitude detection, and increases the amount of voltage outputted from the loop filter when the amplitude signal is less than the standard voltage for amplitude detection.

19. An electronic timepiece comprising:
a piezoelectric actuator according to claim 9; and
a date display mechanism driven by the piezoelectric actuator.

20. An electronic device comprising:
a piezoelectric actuator according to claim 9.

21. A control program for a drive device for a piezoelectric actuator for supplying a drive signal to a piezoelectric element in the piezoelectric actuator comprising:
code for supplying a drive signal with a specific frequency to the piezoelectric element having contact sections being convexities arranged on opposite sides thereof, one of the contact sections being configured to contact a driven object;

code for oscillating an oscillator due to the supply of the drive signal to the piezoelectric element;

code for detecting the amplitude of a detection signal indicating the oscillating state of the oscillator; and code for detecting the detection signal;

code for controlling the frequency of the drive signal sent to the piezoelectric element on the basis of the detection signal or the detection signal and the drive signal; and code for comparing the amplitude and the standard amplitude value and controlling the frequency of the drive signal on the basis of the results of this comparison.

22. A storage medium capable of being read by a computer that stores the control program according to claim 21.

23. The piezoelectric actuator according to claim 13, further comprising a phase difference detection device detecting a detection signal that indicates the oscillating state of the oscillator and detecting the phase difference between the detection signal and the drive signal or the phase difference between a plurality of detection signals, wherein the frequency control device compares the phase difference detected by the phase difference detection device with a standard phase difference value and controls the frequency of the drive signal sent to the piezoelectric element on the basis of the results of this comparison, and also compares the amplitude and the standard amplitude value and controls the frequency of the drive signal on the basis of the results of this comparison.

24. An electronic timepiece comprising:

a piezoelectric actuator according to claim 13; and a date display mechanism driven by the piezoelectric actuator.

25. An electronic device comprising:

a piezoelectric actuator according to claim 13.

26. A drive method for a piezoelectric actuator comprising:

supplying a drive signal with a specific frequency to a piezoelectric element to oscillate an oscillator of the piezoelectric element by a drive device;

controlling the frequency of the drive signal by a frequency control device of the drive device;

detecting an amplitude of a detection signal by an amplitude detection circuit of the drive device;

controlling the increase or decrease in the frequency of the drive signal by a frequency increase/decrease control device of the frequency control device;

controlling the rate of change of the increase or decrease in the frequency of the drive signal by a frequency increase/decrease rate control device of the frequency control device;

detecting a detection signal indicating the oscillating state of the oscillator and controlling the frequency of the drive signal on the basis of the detection signal and the drive signal, or on the basis of the detection signal by either one of the frequency increase/decrease control device or frequency increase/decrease rate control device; and comparing the amplitude and a standard amplitude value and controlling the frequency of the drive signal on the basis of the results of this comparison by the other one of the frequency increase/decrease control device or frequency increase/decrease rate control device.

27. A drive method for a piezoelectric actuator comprising:

supplying a drive signal with a specific frequency to a piezoelectric element to oscillate an oscillator of the piezoelectric element by a drive device;

controlling the frequency of the drive signal by a frequency control device of the drive device;

detecting the amplitude of a detection signal by an amplitude detection circuit of the drive device;

detecting a detection signal indicating the oscillating state of the oscillator and controlling the frequency of the drive signal based on results of comparing the amplitude of the detection signal and a standard amplitude value by the frequency control device;

outputting a standard voltage for phase difference comparison and a standard voltage for amplitude detection by a constant voltage circuit of the frequency control device;

comparing the standard voltage for phase difference comparison outputted by the constant voltage circuit with a phase difference voltage outputted from a phase difference/voltage conversion circuit, and outputting a comparison result signal by a comparison circuit of the frequency control device;

receiving the comparison result signal outputted by the comparison circuit and controlling the frequency of the drive signal sent to the piezoelectric element by a drive control section of the frequency control device;

detecting amplitude by comparing the standard voltage for amplitude detection outputted by the constant voltage circuit with the detection signal by the amplitude detection circuit by the amplitude detection circuit; and decreasing the rate of change in frequency over a specific period of time when the amplitude detection voltage detected by the amplitude detection circuit is equal to or greater than the standard voltage for amplitude detection, and increasing the rate of change in frequency over a specific period of time when the amplitude detection voltage detected by the amplitude detection circuit is less than the standard voltage for amplitude detection by the drive control section.

* * * * *